United States Patent
Yanada et al.

(10) Patent No.: US 9,554,070 B2
(45) Date of Patent: Jan. 24, 2017

(54) IMAGING DEVICE FOR REDUCING PRESSURE ON DATA BUS BANDWIDTH

(71) Applicant: OLYMPUS CORPORATION, Tokyo (JP)

(72) Inventors: Takashi Yanada, Tokyo (JP); Yoshinobu Tanaka, Tokyo (JP); Ayahiko Takahashi, Tokyo (JP); Akira Ueno, Tokyo (JP)

(73) Assignee: Olympus Corporation, Tokyo (JP)

( * ) Notice: Subject to any disclaimer, the term of this patent is extended or adjusted under 35 U.S.C. 154(b) by 177 days.

(21) Appl. No.: 14/477,182

(22) Filed: Sep. 4, 2014

(65) Prior Publication Data

US 2015/0070527 A1 Mar. 12, 2015

(30) Foreign Application Priority Data

Sep. 9, 2013 (JP) .................................. 2013-186470

(51) Int. Cl.
*H04N 5/228* (2006.01)
*H04N 5/376* (2011.01)
*H04N 5/232* (2006.01)

(52) U.S. Cl.
CPC ........ *H04N 5/3765* (2013.01); *H04N 5/23229* (2013.01); *H04N 5/23241* (2013.01)

(58) Field of Classification Search
CPC .............. H04N 5/3765; H04N 5/23241; H04N 5/23229
USPC ...................................................... 348/222.1
See application file for complete search history.

(56) References Cited

U.S. PATENT DOCUMENTS

| 2003/0020936 | A1* | 1/2003 | Nakajima | .......... H04N 1/32561 |
| | | | | 358/1.9 |
| 2003/0210335 | A1* | 11/2003 | Carau, Sr. | ............ H04N 1/2112 |
| | | | | 348/231.2 |
| 2003/0210830 | A1* | 11/2003 | Goto | ...................... H04N 19/86 |
| | | | | 382/268 |
| 2013/0162863 | A1* | 6/2013 | Tanaka | .................. H04N 9/735 |
| | | | | 348/223.1 |

FOREIGN PATENT DOCUMENTS

| JP | 4179701 B2 | 11/2008 |
| JP | 2010-199880 A | 9/2010 |
| JP | 2013-135410 A | 7/2013 |

* cited by examiner

*Primary Examiner* — Antoinette Spinks
(74) *Attorney, Agent, or Firm* — Westerman, Hattori, Daniels & Adrian, LLP

(57) ABSTRACT

An imaging device includes a solid-state imaging device, a storage unit, an imaging-processing unit configured to process input image data output from the solid-state imaging device or image data stored in the storage unit, and a timing-generating unit configured to generate timings at which the solid-state imaging device and the imaging-processing unit operate. The timing-generating unit generates a first synchronization signal for driving the solid-state imaging device to output the first synchronization signal to the solid-state imaging device and output the first synchronization signal and a first clock signal input from the solid-state imaging device to the imaging-processing unit in a first operation based on the timing of the solid-state imaging device. The timing-generating unit outputs a generated second synchronization signal and second clock signal to the imaging-processing unit in a second operation based on an internal timing of the imaging-processing unit.

6 Claims, 10 Drawing Sheets

PRIOR ART

IMAGING DEVICE FOR REDUCING PRESSURE ON DATA BUS BANDWIDTH

BACKGROUND OF THE INVENTION

Field of the Invention

The present invention relates to an imaging device. Priority is claimed on Japanese Patent Application No. 2013-186470, filed Sep. 9, 2013, the content of which is incorporated herein by reference.

Description of Related Art

Various processes are performed on a signal (hereinafter referred to as a "pixel signal") of each pixel output from a solid-state imaging device provided in an imaging device in photographing in an imaging device such as a digital camera. These processes include a process of forming an image captured by the solid-state imaging device, a process of performing control related to photographing by the imaging device, etc. In general, the solid-state imaging device performs raster scanning and sequentially outputs pixel signals in a horizontal direction (lateral direction) for an image.

Thus, an image-processing device provided in an imaging device and configured to process a pixel signal output by the solid-state imaging device is provided with a line memory configured to temporarily store pixel signals of the horizontal direction output by the solid-state imaging device in a number of rows necessary for image processing.

In recent imaging devices, the number of pixels of the solid-state imaging device has increased with a change to high resolution of an image to be captured and the number of pixels of the horizontal direction of the solid-state imaging device is also increasing year by year. Thus, in the image-processing device, a storage capacity of the line memory also increases according to the number of pixels of the horizontal direction in which image processing is performed. An increase in the storage capacity of the line memory in the image-processing device becomes a factor which increases a circuit scale of the imaging device.

Therefore, for example, as disclosed in Japanese Patent No. 4179701, technology of an image-processing device for performing image processing on one image through a plurality of separate operations is disclosed. In the technology disclosed in Japanese Patent No. 4179701, a pixel signal output from the solid-state imaging device is temporarily stored in a frame memory provided outside the image-processing device and then one image is generated through a plurality of image-processing operations while pixel signals necessary for the processing are read from the frame memory. For example, in the technology disclosed in Japanese Patent No. 4179701, as illustrated in FIG. 10, the entire region of one image is divided into two regions, image processing is performed on a half region of one side (left) in first image processing, and image processing is performed on a half region of the other side (right) in the second image processing. As described above, in the technology disclosed in Japanese Patent No. 4179701, one image is divided into a plurality of blocks and image processing is performed through operations equal in number to the division blocks, so that one image can be generated in the storage capacity of the line memory which is less than the number of pixels of the horizontal direction in which the solid-state imaging device performs an output operation.

In addition, for example, as disclosed in Japanese Unexamined Patent Application, First Publication No. 2013-135410, technology of an evaluation value-generating device for generating an evaluation value for enabling an imaging device to control photographing based on image data after image processing is disclosed. In the technology disclosed in Japanese Unexamined Patent Application, First Publication No. 2013-135410, it is possible to generate an evaluation value based on a pixel signal output from the solid-state imaging device in real time and generate an evaluation value based on an element other than a pixel signal input in real time by reading image data after image processing stored in the storage unit. For example, in the technology disclosed in Japanese Unexamined Patent Application, First Publication No. 2013-135410, it is possible to re-store a combined image obtained by combining images in the storage unit while storing a plurality of images obtained by changing an exposure condition of the solid-state imaging device in the storage unit and generate an evaluation value based on the combined image re-stored in the storage unit.

In this manner, the image-processing device provided in the imaging device performs a process of forming an image or a process to control photographing while accessing a frame memory or a memory such as a storage unit storing an image as in the technology disclosed in Japanese Patent No. 4179701 or the technology disclosed in Japanese Unexamined Patent Application, First Publication No. 2013-135410.

Incidentally, a plurality of functional blocks for performing processes according to functions are provided in the imaging device to implement various functions to be performed by the imaging device. In this imaging device, a configuration is well-known in which each functional block uses the same memory as that used when the image-processing device performs a process. That is, in such imaging device, a configuration in which one memory is shared by an image-processing device and a plurality of functional blocks (hereinafter referred to as "processing blocks" when the image-processing device and the plurality of functional blocks are represented without distinction) is commonly adopted. Thus, in the imaging device, there is a configuration in which the memory shared by the processing blocks is also connected to a data bus to which the plurality of processing blocks provided in the imaging device are connected. Then, each processing block accesses the memory via the data bus. Thus, data read from the memory through each processing block and data written to the memory through each processing block all pass through the data bus.

The timing at which each processing block performs a process differs according to each operation in the imaging device. In addition, a bus bandwidth representing an amount of data passing through the data bus when each processing block accesses the memory differs according to a process to be performed by each processing block. Thus, for example, when access from a plurality of processing blocks to the memory occurs within the same period, data flowing through the data bus is concentrated in this period and pressure is imposed on the bus bandwidth. Due to this, in the imaging device, it is important to secure a necessary bus bandwidth when each processing block performs a process.

Then, for example, as disclosed in Japanese Unexamined Patent Application, First Publication No. 2010-199880, technology of an imaging device for leveling an amount of data on a data bus is disclosed. In the technology disclosed in Japanese Unexamined Patent Application, First Publication No. 2010-199880, the amount of data on the data bus is temporally equalized and leveled to prevent data from concentrating in a partial period by setting the speed at which the processing block outputs the data to the data bus to a slow speed with respect to a speed at which data is input to the processing block. Thereby, in the technology disclosed in Japanese Unexamined Patent Application, First Publication No. 2010-199880, the pressure on the bus bandwidth of the data bus in the imaging device can be suppressed and the data bus can be efficiently used.

A configuration used to flatten the amount of data on the data bus is a configuration that delays the output of the data that is input earlier, that is, a configuration as a buffer to absorb the time difference between the input and output of the data is necessary. In the technology disclosed in Japanese Unexamined Patent Application, First Publication No. 2010-199880, a configuration to absorb a time difference between the input and output of the data is disclosed as a memory which stores (writes) the input data temporarily and outputs (reads out) the stored data in accordance with the timing when the data is output to the data bus. Regarding the capacity of the memory serves as the buffer to absorb the time difference between the input and output of the data, it is known that the bigger the time difference between the input and output of the data is, the more the required memory is.

SUMMARY OF THE INVENTION

According to a first aspect of the present invention, an imaging device includes: a solid-state imaging device configured to include a plurality of pixels, output a pixel signal according to an image of an imaged subject as input image data, and output a first clock signal which is a timing at which the input image data is output; a storage unit configured to store data; an imaging-processing unit configured to process the input image data output from the solid-state imaging device or image data stored in the storage unit; and a timing-generating unit configured to generate timings at which the solid-state imaging device and the imaging-processing unit operate. In a first operation in which the imaging-processing unit processes the input image data output from the solid-state imaging device based on the timing of the solid-state imaging device, the timing-generating unit generates a first synchronization signal for driving the solid-state imaging device to output the generated first synchronization signal to the solid-state imaging device and output the first synchronization signal and a first clock signal input from the solid-state imaging device to the imaging-processing unit as the timing at which the imaging-processing unit operates. In a second operation in which the imaging-processing unit processes the image data stored in the storage unit based on an internal timing of the imaging-processing unit, the timing-generating unit outputs a generated second synchronization signal and second clock signal to the imaging-processing unit as the timing at which the imaging-processing unit operates and does not output the first synchronization signal to the solid-state imaging device.

According to a second aspect of the present invention, in the imaging device according to the first aspect, the timing-generating unit may include: a synchronization signal-generating unit configured to generate the first synchronization signal in the first operation and generate the second synchronization signal in the second operation; a clock signal-generating unit configured to generate the second clock signal in the second operation; and a clock-selecting unit configured to select and output the first clock signal in the first operation and select and output the second clock signal in the second operation.

According to a third aspect of the present invention, in the imaging device according to the second aspect, the synchronization signal-generating unit may generate the second synchronization signal having different synchronization from the first synchronization signal, and the clock signal-generating unit may generate the second clock signal having a different frequency from the first clock signal.

According to a fourth aspect of the present invention, in the imaging device according to the third aspect, the imaging-processing unit may further include: a processing unit configured to output data obtained by processing the input image data output from the solid-state imaging device or image data stored in the storage unit; a data transfer unit configured to transfer the data output by the processing unit to the storage unit; and a data-acquiring unit configured to acquire the image data stored in the storage unit.

According to a fifth aspect of the present invention, in the imaging device according to the fourth aspect, the processing unit may include a pre-processing unit configured to output pre-processed image data obtained by pre-processing the input image data input from the solid-state imaging device, and the data transfer unit may transfer the pre-processed image data to the storage unit.

According to a sixth aspect of the present invention, in the imaging device according to the fifth aspect, the pre-processing unit may include a line memory configured to hold an amount of input image data which is less than a data amount of the input image data of a first direction in the image and output the pre-processed image data obtained by pre-processing part of the input image data of the image divided within a range of a data amount of the input image data capable of being held by the line memory. The data transfer unit may include: a first transfer unit configured to transfer the pre-processed image data to the storage unit; and a second transfer unit configured to transfer the remaining input image data of the first direction in the image which has not been pre-processed by the pre-processing unit as original image data to the storage unit. The data-acquiring unit may acquire the original image data stored in the storage unit. The image-processing unit may further include: a selecting unit configured to output the input image data input from the solid-state imaging device or the original image data acquired by the data-acquiring unit to at least one of the pre-processing unit and the second data transfer unit.

According to a seventh aspect of the present invention, in the imaging device according to the sixth aspect, in the first operation, the imaging-processing unit may transfer first pre-processed image data after the pre-processing unit has pre-processed the input image data of a first image obtained by dividing the image within the range of the data amount of the input image data capable of being held by the line memory to the storage unit through the first data transfer unit and transfers the input image data of a second image obtained by dividing the image which has not been pre-processed by the pre-processing unit as original data to the storage unit through the second data transfer unit. In the second operation after the first operation has been completed, the data-acquiring unit may acquire the original data stored in the storage unit, the selecting unit may output the original data to the pre-processing unit, and the pre-processing unit may transfer second pre-processed image data obtained by pre-processing the original data to the storage unit through the first data transfer unit.

According to an eighth aspect of the present invention, in the imaging device according to the fifth aspect, the processing unit may further include: a signal-processing unit configured to transfer processed data obtained by processing the image data stored in the storage unit to the storage unit.

According to a ninth aspect of the present invention, in the imaging device according to the eighth aspect, the signal-processing unit may be an evaluation value-generating unit configured to generate an evaluation value for controlling photographing in the imaging device as the processed data based on the image data stored in the storage unit. The imaging-processing unit may further include: a selecting unit configured to output at least one of the pre-processed image data and the image data acquired by the data-acquiring unit to the evaluation value-generating unit.

According to a tenth aspect of the present invention, in the imaging device according to the ninth aspect, in the first operation, the imaging-processing unit may transfer the pre-processed image data after the pre-processing unit has pre-processed the input image data to the storage unit through the data transfer unit. In the second operation after the first operation has been completed, the data-acquiring unit may acquire the pre-processed image data stored in the storage unit or pre-processed image data after image processing has been performed by another component provided in the imaging device, the selecting unit may output the pre-processed image data to the evaluation value-generating unit, and the evaluation value-generating unit may transfer the evaluation value generated based on the pre-processed image data to the storage unit as the processed data.

DETAILED DESCRIPTION OF THE INVENTION

First Embodiment

Figure 1:
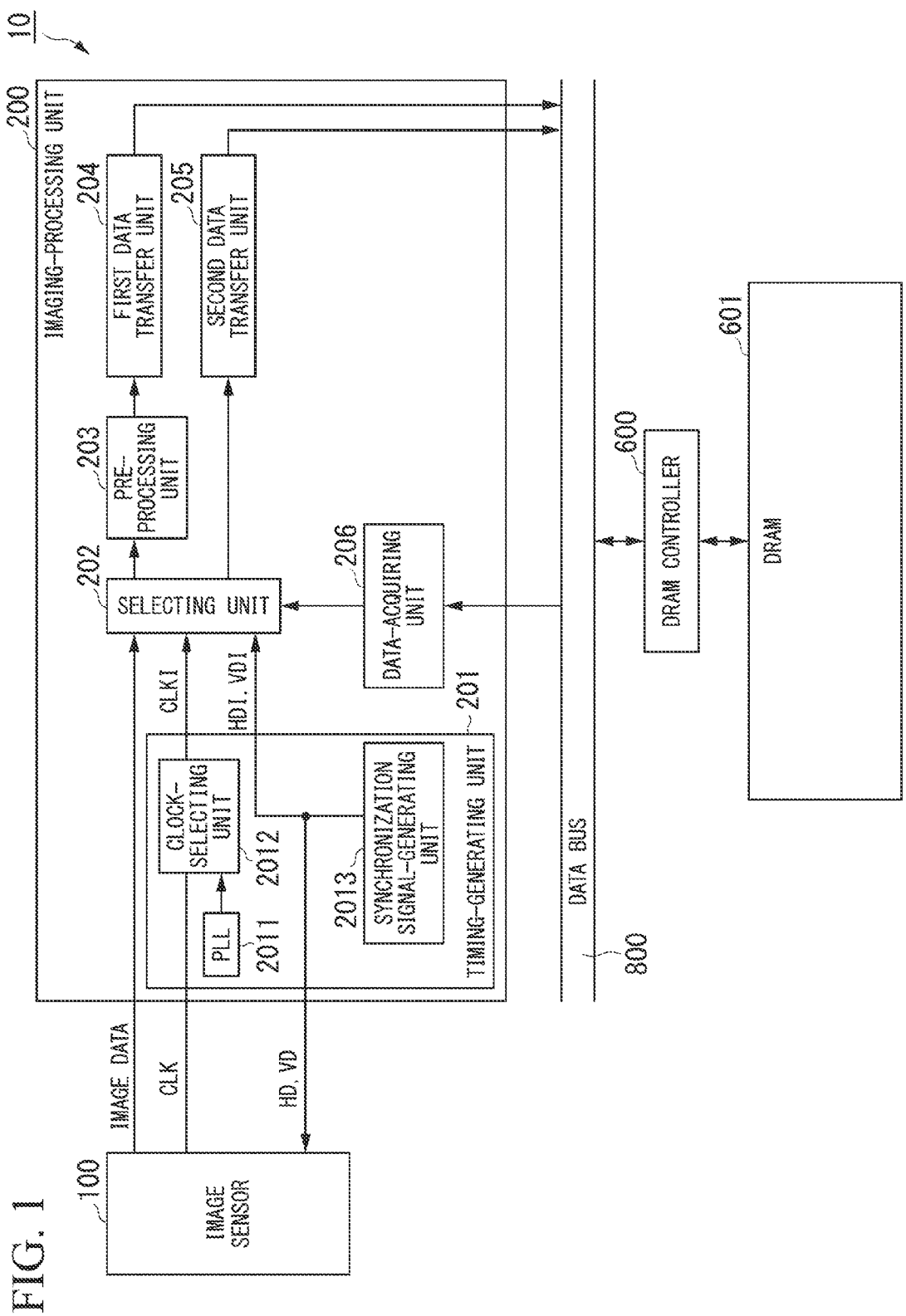
FIG. 1 is a block diagram illustrating a schematic configuration of an imaging device in a first embodiment of the present invention.

Hereinafter, the embodiments of the present invention will be described with reference to the drawings. FIG. 1 is a block diagram illustrating a schematic configuration of an imaging device in the first embodiment of the present invention. The imaging device 10 illustrated in FIG. 1 includes an image sensor 100, an imaging-processing unit 200, a DRAM controller 600, and a DRAM 601.

Each of the imaging-processing unit 200 and the DRAM controller 600 within the imaging device 10 is connected via a data bus 800, and, for example, reads data from the DRAM 601 connected to the DRAM controller 600 via direct memory access (DMA) and writes data to the DRAM 601.

In addition to components illustrated in FIG. 1, for example, components for implementing various functions to be executed by the imaging device 10 such as an image-processing unit, a display processing unit, a display device, a card interface (I/F) unit, and a central processing unit (CPU) are provided in the imaging device 10. In addition, in the imaging device 10, for example, a component detachable from the imaging device 10 such as a recording medium to be controlled through the card I/F unit may also be included in a component of the imaging device 10. In this case, in addition to the imaging-processing unit 200 and the DRAM controller 600 illustrated in FIG. 1, the image-processing unit, the display processing unit, the card I/F unit, and the CPU provided in the imaging device 10 are connected to the data bus 800. Each component, for example, accesses the DRAM 601 connected to the DRAM controller 600 through the DMA via the data bus 800.

The image sensor 100 is a solid-state imaging device represented by a charge coupled device (CCD) image sensor or a complementary metal-oxide semiconductor (CMOS) image sensor for photoelectrically converting an optical image of a subject imaged through a lens (not illustrated). The image sensor 100 performs raster scanning on pixels provided in the image sensor 100 itself according to a horizontal synchronization signal HD and a vertical synchronization signal VD input from the imaging-processing unit 200. The image sensor 100 sequentially outputs pixel signals according to subject light as image data to the imaging-processing unit 200 in the horizontal direction with respect to the image at the timing of a clock signal CLK. In addition, the image sensor 100 outputs the clock signal CLK, which is the timing at which image data of each pixel is output, to the imaging-processing unit 200.

The imaging-processing unit 200 fetches image data input from the image sensor 100, pre-processes the fetched image data, and transfers (writes) image data of a pre-processing result to the DRAM 601 via the DRAM controller 600. The imaging-processing unit 200 includes a timing-generating unit 201, a selecting unit 202, a pre-processing unit 203, a first data transfer unit 204, a second data transfer unit 205, and a data-acquiring unit 206.

A data amount of image data capable of being pre-processed by the imaging-processing unit 200, that is, a data amount of the horizontal direction for the image, is less than a data amount of image data to be output by the image sensor 100 as a data amount of one row. Thus, the imaging-processing unit 200 transfers (writes) image data which is not capable of being pre-processed to the DRAM 601 via the DRAM controller 600 without change, that is, without performing pre-processing. Then, after pre-processing of an amount of data capable of being pre-processed has been completed, the imaging-processing unit 200 acquires image data which is stored in the DRAM 601 without change and is not pre-processed, and pre-processes the acquired image data to transfer (write) the pre-processed image data to the DRAM 601 again. That is, when image data of a data amount of the horizontal direction which is not capable of being pre-processed has been input, the imaging-processing unit 200 pre-processes all input image data through a plurality of separate operations in a range of a data amount capable of being pre-processed.

The timing-generating unit 201 generates a synchronization signal for driving the image sensor 100 and a synchronization signal and a clock signal to be used when each component provided in the imaging-processing unit 200 operates. The timing-generating unit 201 outputs the generated synchronization signal and clock signal to each component provided in the image sensor 100 and the imaging-processing unit 200 according to a state when the imaging-processing unit 200 performs pre-processing.

More specifically, the timing-generating unit 201 generates a horizontal synchronization signal HD and a vertical synchronization signal VD when image data is output from the image sensor 100. In addition, the timing-generating unit 201 generates a horizontal synchronization signal HDI, a vertical synchronization signal VDI, and a clock signal to be used when the imaging-processing unit 200 pre-processes image data. The imaging-processing unit 200 performs pre-processing based on the timing of the image sensor 100. That is, the imaging-processing unit 200 performs pre-processing based on the timing at which the image sensor 100 outputs image data. At this time, the timing-generating unit 201 outputs the generated horizontal synchronization signal HD and vertical synchronization signal VD to the image sensor 100. At this time, the timing-generating unit 201 outputs the same synchronization signals as the horizontal synchronization signal HD and the vertical synchronization signal VD output to the image sensor 100 as the horizontal synchronization signal HDI and the vertical synchronization signal VDI and the clock signal CLK input from the image sensor 100 as the clock signal CLKI to each component provided in the imaging-processing unit 200.

When the imaging-processing unit 200 performs pre-processing based on the internal timing of the imaging-processing unit 200, the timing-generating unit 201 outputs the generated horizontal synchronization signal HDI and vertical synchronization signal VDI and the generated clock signal to each component provided in the imaging-processing unit 200. At this time, the timing-generating unit 201 can also be configured to prevent the same synchronization signals as the generated horizontal synchronization signal HDI and vertical synchronization signal VDI from being output as the horizontal synchronization signal HD and the vertical synchronization signal VD to the image sensor 100.

The timing-generating unit 201 includes a phase locked loop (PLL) 2011, a clock-selecting unit 2012, and a synchronization signal-generating unit 2013.

The PLL 2011 generates a clock signal when the imaging-processing unit 200 generates the clock signal based on the internal timing. Then, the PLL 2011 outputs the generated clock signal to the clock-selecting unit 2012. The clock signal generated by the PLL 2011 is a clock signal of a frequency at which the imaging-processing unit 200 can complete pre-processing on image data. The frequency of the clock signal may be a predetermined frequency, or, for example, may be a frequency set by a CPU (not illustrated) provided in the imaging device 10.

According to a state when the imaging-processing unit 200 performs pre-processing, the clock-selecting unit 2012 selects one clock signal of the clock signal CLK input from the image sensor 100 and the clock signal input from the PLL 2011 as the clock signal CLKI by which each component provided in the imaging-processing unit 200 is operated. More specifically, when the imaging-processing unit 200 performs pre-processing based on the timing of the image sensor 100, the clock-selecting unit 2012 selects the clock signal CLK input from the image sensor 100 as the clock signal CLKI. In addition, when the imaging-processing unit 200 performs pre-processing based on the internal timing, the clock-selecting unit 2012 selects the clock signal input from the PLL 2011 as the clock signal CLKI. Then, the clock-selecting unit 2012 outputs the selected clock signal CLKI to the selecting unit 202.

The synchronization signal-generating unit 2013 generates a synchronization signal for driving the image sensor 100 and a synchronization signal to be used when each component provided in the imaging-processing unit 200 operates. Then, the synchronization signal-generating unit 2013 outputs the generated synchronization signals to the image sensor 100 and the selecting unit 202 according to a state when the imaging-processing unit 200 performs pre-processing.

More specifically, when the imaging-processing unit 200 performs pre-processing based on a timing of the image sensor 100, the synchronization signal-generating unit 2013 generates the horizontal synchronization signal HD and the vertical synchronization signal VD for performing a driving operation of outputting image data from the image sensor 100, and outputs the generated horizontal synchronization signal HD and vertical synchronization signal VD to the image sensor 100. At this time, the synchronization signal-generating unit 2013 outputs the horizontal synchronization signal HD and the vertical synchronization signal VD output to the image sensor 100 as the horizontal synchronization signal HDI and the vertical synchronization signal VDI to the selecting unit 202. At this time, it is desirable for the horizontal synchronization signal HD and the vertical synchronization signal VD generated by the synchronization signal-generating unit 2013 to be synchronized with the clock signal CLK input from the image sensor 100.

In addition, when the imaging-processing unit 200 performs pre-processing based on the internal timing, the synchronization signal-generating unit 2013 generates the horizontal synchronization signal HDI and the vertical synchronization signal VDI for enabling each component provided in the imaging-processing unit 200 to perform pre-processing at the timing of the clock signal CLKI output from the clock-selecting unit 2012, and outputs the generated horizontal synchronization signal HDI and vertical synchronization signal VDI to the selecting unit 202. At this time, the synchronization signal-generating unit 2013 can also perform a process so that the generated horizontal synchronization signal HDI and vertical synchronization signal VDI are not output as the horizontal synchronization signal HD and the vertical synchronization signal VD to the image sensor 100. That is, the imaging-processing unit 200 can also perform a process to prevent the image sensor 100 from being driven when performing pre-processing based on the internal timing. At this time, it is desirable for the horizontal synchronization signal HDI and the vertical synchronization signal VDI generated by the synchronization signal-generating unit 2013 to be synchronized with the clock signal output by the PLL 2011.

The selecting unit 202 selects a component of an output destination of the input image data. More specifically, one or both of the pre-processing unit 203 and the second data transfer unit 205 are selected as the output destinations of the image data output from the image sensor 100 and the image data input from the data-acquiring unit 206. Then, the selecting unit 202 outputs the input image data to the selected output destination(s).

In addition, the selecting unit 202 selects components which are output destinations of the horizontal synchronization signal HDI, the vertical synchronization signal VDI, and the clock signal CLKI input from the clock-selecting unit 2012. More specifically, the selecting unit 202 selects all components to operate when the imaging-processing unit 200 performs pre-processing. The selecting unit 202 outputs each of the horizontal synchronization signal HDI, the vertical synchronization signal VDI, and the clock signal CLKI to each selected component.

In the imaging device according to the present embodiment, the selecting unit 202 is not limited to a configuration in which each of the horizontal synchronization signal HDI, the vertical synchronization signal VDI, and the clock signal CLKI input from the clock-selecting unit 2012 is output to all components which operate when the imaging-processing unit 200 performs pre-processing. For example, the clock-selecting unit 2012 may be a configuration in which each of the horizontal synchronization signal HDI, the vertical synchronization signal VDI, and the clock signal CLKI is output to all components which operate when the imaging-processing unit 200 performs pre-processing.

The pre-processing unit 203 performs various pre-processing such as defect correction, shading correction, and pixel defect correction on image data input from the selecting unit 202 based on the horizontal synchronization signal HDI, the vertical synchronization signal VDI, and the clock signal CLKI input from the selecting unit 202. The pre-processing unit 203 outputs image data (hereinafter referred to as "pre-processed image data") of a processing result to the first data transfer unit 204. The configuration of the pre-processing unit 203 or a processing method and operation of pre-processing in the pre-processing unit 203 are similar to a configuration or a processing method and operation of a pre-processing unit provided in the conventional imaging device. Accordingly, detailed description related to the configuration or the processing method and operation of the pre-processing unit 203 will be omitted.

The first data transfer unit 204, for example, stores (writes) the pre-processed image data input from the pre-processing unit 203 in (to) the DRAM 601 connected to the DRAM controller 600 through the DMA based on the horizontal synchronization signal HDI, the vertical synchronization signal VDI, and the clock signal CLKI input from the selecting unit 202. Because the configuration of the first data transfer unit 204 or the operation in which the pre-processed image data is stored in (written to) the DRAM 601 through the DMA is similar to a normal configuration or operation for storing data through the DMA, detailed description thereof will be omitted. A method in which the first data transfer unit 204 stores (writes) the pre-processed image data in (to) the DRAM 601 may be a method other than the DMA.

The second data transfer unit 205, for example, stores (writes) image data input from the selecting unit 202, that is, image data (hereinafter referred to as "original image data") which has not been pre-processed by the pre-processing unit 203, in (to) the DRAM 601 connected to the DRAM controller 600 through the DMA based on the horizontal synchronization signal HDI, the vertical synchronization signal VDI, and the clock signal CLKI input from the selecting unit 202. Because the configuration of the second data transfer unit 205 or the operation in which the original image data is stored in (written to) the DRAM 601 through the DMA is similar to a normal configuration or operation for storing data through the DMA as in the first data transfer unit 204, detailed description thereof will be omitted. A method in which the second data transfer unit 205 stores (writes) the original image data in (to) the DRAM 601 may be a method other than the DMA as in the first data transfer unit 204.

Based on the horizontal synchronization signal HDI, the vertical synchronization signal VDI, and the clock signal CLKI input from the selecting unit 202, the data-acquiring unit 206, for example, acquires (reads) image data stored in the DRAM 601 via the DRAM controller 600 through the DMA, and outputs the acquired image data to the selecting unit 202. The image data acquired by the data-acquiring unit 206, for example, may be pre-processed image data stored by the first data transfer unit 204 or image data stored in the DRAM 601 after image processing has been performed by an image-processing unit (not illustrated) provided in the imaging device 10 as well as original image data stored by the second data transfer unit 205.

The DRAM controller 600 controls a process of storing (writing) data in (to) the connected DRAM 601 and acquiring (reading) data from the DRAM 601 according to an access request from a plurality of components within the imaging device 10 connected to the data bus 800 to the DRAM 601, for example, an access request of the DMA.

The DRAM 601 is a memory (storage unit) for which access is controlled by the DRAM controller 600. The DRAM 601 temporarily stores various data in a processing process of each component within the imaging device 10.

Through this configuration, in the imaging device 10 according to the first embodiment, it is possible to directly perform various pre-processing on fetched image data while fetching the image data output from the image sensor 100 in real time. In addition, in the imaging device 10 according to the first embodiment, it is possible to perform various pre-processing on image data stored in the DRAM 601 by acquiring image data stored in the DRAM 601 by the data-acquiring unit 206. That is, in the imaging device 10 according to the first embodiment, it is also possible to perform various pre-processing on image data input in real time.

Next, an example of an operation of pre-processing image data output from the image sensor 100 in the imaging device 10 will be described. In the following description, the case in which the number of pixels of the horizontal direction of the image sensor 100 is greater than the number of pixels of the horizontal direction capable of being pre-processed by the pre-processing unit 203 provided in the imaging-processing unit 200 at once will be described. That is, an operation in which a data amount of image data (hereinafter referred to as "input image data") of the horizontal direction output by the image sensor 100 for every row is greater than a data amount of image data of one row capable of being held by a line memory of the horizontal direction provided for the pre-processing unit 203 to perform pre-processing and all input image data of the one row is pre-processed through a plurality of separate operations in a range of an amount of data capable of being pre-processed will be described. In the following description, for ease of description, the case in which input image data input from the image sensor 100 is pre-processed in halves through two separate operations will be described.

Figure 2:
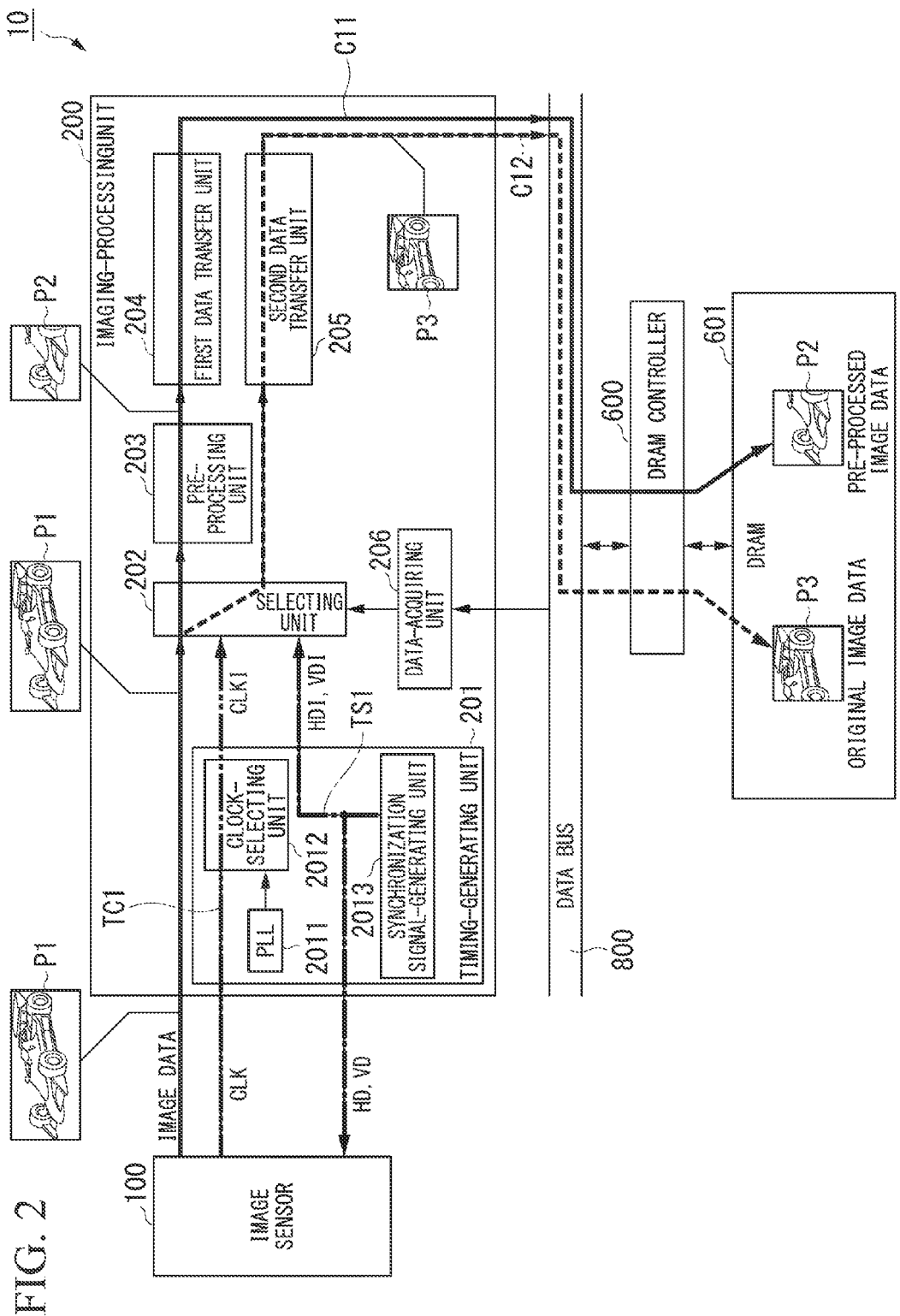
FIG. 2 is a diagram schematically illustrating an example of a first operation in image processing by the imaging device according to the first embodiment.
Figure 3:
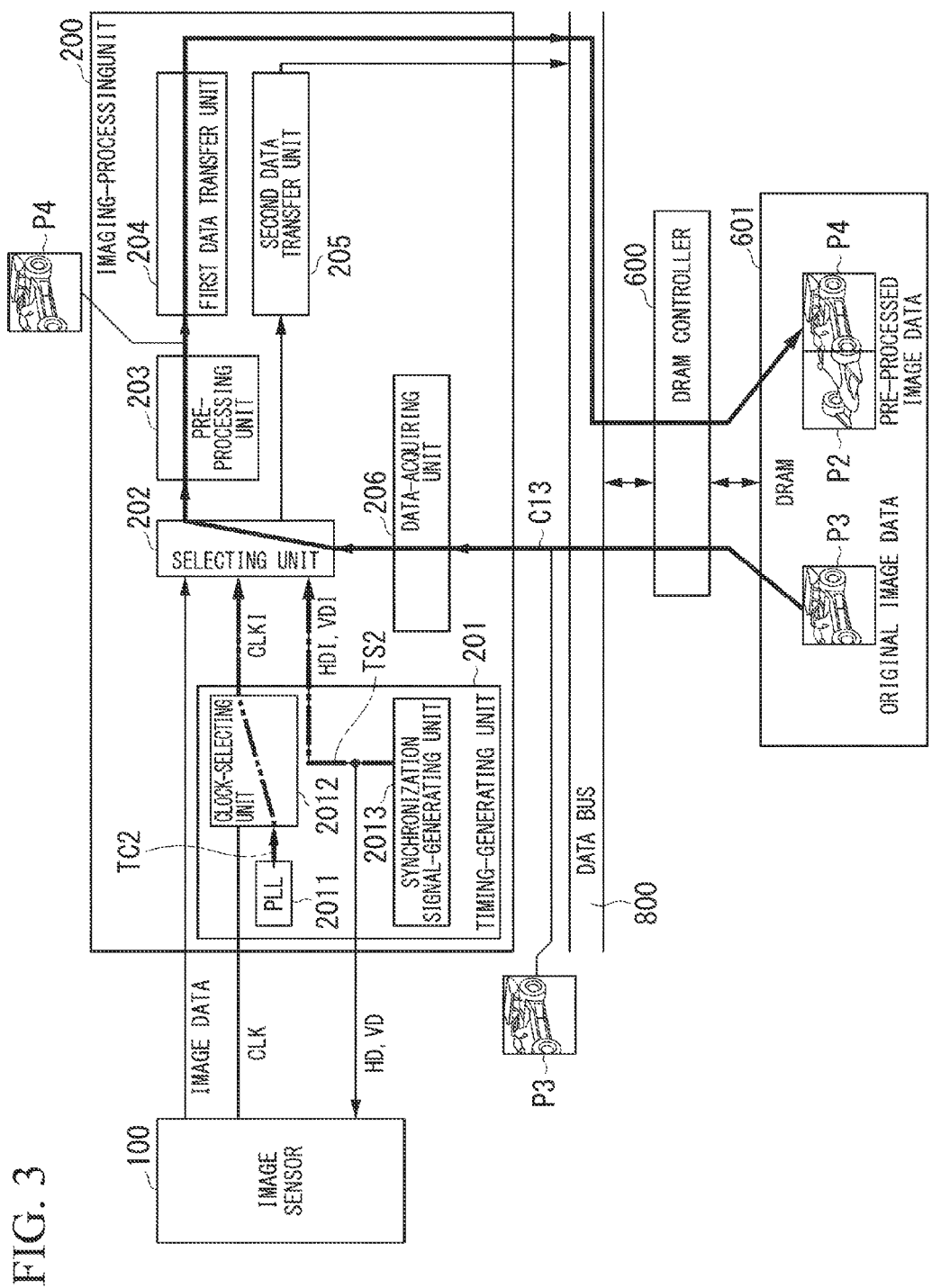
FIG. 3 is a diagram schematically illustrating an example of a second operation in image processing by the imaging device according to the first embodiment.

Each of FIGS. 2 and 3 is a diagram schematically illustrating an example of a pre-processing operation by the imaging device 10 according to the first embodiment. In FIG. 2, an example of a first operation in which the imaging device 10 pre-processes input image data of one (left) half input from the image sensor 100 is illustrated. In addition, in FIG. 3, an example of a second operation in which the imaging device 10 pre-processes input image data of the other (right) half input from the image sensor 100 is illustrated.

<First Operation>

In the first operation (an operation of a first pass), pre-processed image data obtained by pre-processing input image data output from the image sensor 100 in real time is transferred (written) to the DRAM 601, and the input image data which is not capable of being pre-processed is transferred (written) to the DRAM 601 without change. The operation of the first pass is an operation in which the imaging-processing unit 200 performs pre-processing based on the timing of the image sensor 100. In the operation of the first pass, pre-processing based on the timing of the image sensor 100 is done to perform pre-processing in the imaging-processing unit 200 without loss in all input image data input from the image sensor 100. In FIG. 2, paths of the synchronization signal and the clock signal in the first operation (the operation of the first pass) and each data path are illustrated on the block diagram of the imaging device 10 illustrated in FIG. 1.

First, in the operation of the first pass, in a path of a synchronization signal of a path TS 1 illustrated in FIG. 2, the horizontal synchronization signal HD and the vertical synchronization signal VD for driving the image sensor 100 generated by the synchronization signal-generating unit 2013 are output to the image sensor 100, and the horizontal synchronization signal HD and the vertical synchronization signal VD are output as the horizontal synchronization signal HDI and the vertical synchronization signal VDI to the selecting unit 202. In addition, in the operation of the first pass, in a path of a clock signal of a path TC1 illustrated in FIG. 2, the clock signal CLK input from the image sensor 100 selected by the clock-selecting unit 2012 is output as the clock signal CLKI to the selecting unit 202.

Then, in the operation of the first pass, in the path of image data of the path C11 illustrated in FIG. 2, pre-processed image data obtained by pre-processing input image data in real time is transferred (written) to the DRAM 601. More specifically, in the operation of the first pass, the image sensor 100 captures one image P1 and input image data of the captured image P1 is output to the imaging-processing unit 200 at the timing synchronized with the clock signal CLK. In the imaging-processing unit 200, input image data of the entire region of an image P1 input from the image sensor 100 is fetched at the timing synchronized with the clock signal CLK, and the fetched input image data of the image P1 is sequentially input to the selecting unit 202 within the imaging-processing unit 200 at the timing synchronized with the clock signal CLK. Then, the selecting unit 202 sequentially outputs the input image data of the entire region of the input image P1 to both the pre-processing unit 203 and the second data transfer unit 205 at the timing synchronized with the clock signal CLK.

The pre-processing unit 203 pre-processes input image data of an image P2 which is a left half region within the input image data of the image P1 sequentially input from the selecting unit 202. The pre-processing unit 203 sequentially outputs the pre-processed image data of the image P2 after pre-processing has been performed to the first data transfer unit 204 at the timing synchronized with the clock signal CLK. Then, the first data transfer unit 204 transfers (writes) the pre-processed image data of the image P2 sequentially input from the pre-processing unit 203 to the DRAM 601 via the DRAM controller 600 at the timing synchronized with the clock signal CLK. Thereby, the pre-processed image data of the image P2 after the pre-processing has been performed is stored in the DRAM 601.

In addition, in the operation of the first pass, in a path of image data of a path C12 illustrated in FIG. 2, input image data is transferred (written) to the DRAM 601 without change. More specifically, in the operation of the first pass, the second data transfer unit 205 transfers (writes) input image data of an image P3 that is a right half region within the input image data of the image P1 sequentially input from the selecting unit 202 as original image data of the image P3 without change to the DRAM 601 via the DRAM controller 600 at the timing synchronized with the clock signal CLK. Thereby, the input image data of the image P3 of the right half of the image P1 output by the image sensor 100 is stored in the DRAM 601 without change.

In this manner, in the operation of the first pass, the pre-processed image data of the image P2 obtained by pre-processing the left half region of the image P1 output by the image sensor 100 and the original image data of the image P3 which is the right half region of the image P1 output by the image sensor 100 are stored in the DRAM 601 based on the timing of the image sensor 100.

In the operation of the first pass, when the original image data is stored in the DRAM 601, the input image data of the entire region of the image P1 input from the image sensor 100 can also be stored as the original image data of the image P1 to the DRAM 601. However, as described above, in the operation of the first pass, only the input image data of the image P3 of the right half of the image P1 is stored as the original image data in the DRAM 601. This is because only the input image data of the image P3 which is the right half region of the image P1 which has not been pre-processed in the operation of the first pass is pre-processed in the subsequent second operation (the operation of the second pass). Thereby, it is possible to reduce a storage capacity of the DRAM 601 and avoid unnecessary pressure on a bus bandwidth of the data bus 800.

<Second Operation>

Thereafter, the imaging device 10 transfers (writes) pre-processed image data obtained by pre-processing the original image data of the image P3 which is the input image data of the right half of the image P1 input from the image sensor 100 without being pre-processed in the first operation (the operation of the first pass) to the DRAM 601. The operation of the second pass is an operation in which the imaging-processing unit 200 performs pre-processing based on the internal timing of the imaging-processing unit 200. In FIG. 3, paths of the synchronization signal and the clock signal in the second operation (the operation of the second pass) and a data path are illustrated on the block diagram of the imaging device 10 illustrated in FIG. 1.

First, in the operation of the second pass, in a path of a synchronization signal of a path TS2 illustrated in FIG. 3, the horizontal synchronization signal HDI and the vertical synchronization signal VDI, which are generated by the synchronization signal-generating unit 2013 and used when the image data is pre-processed, are output to the selecting unit 202. In addition, in the operation of the second pass, in the path of the clock signal of a path TC2 illustrated in FIG. 3, a clock signal generated by the PLL 2011 selected by the clock-selecting unit 2012 is output as the clock signal CLKI to the selecting unit 202.

In the operation of the second pass, as described above, the timing-generating unit 201 does not output the generated horizontal synchronization signal HDI and vertical synchronization signal VDI as the horizontal synchronization signal HD and the vertical synchronization signal VD to the image sensor 100. Thereby, in the operation of the second pass, the state is equivalent to that in which the image sensor 100 is not driven and the image sensor 100 is disconnected from the imaging-processing unit 200.

Then, in the operation of the second pass, in a path of image data of a path C13 illustrated in FIG. 3, the pre-processed image data obtained by pre-processing the original image data of the image P3 stored in the DRAM 601 is transferred (written) to the DRAM 601. More specifically, in the operation of the second pass, the data-acquiring unit 206 sequentially acquires (reads) the original image data of the image P3 stored in the DRAM 610 at the timing synchronized with the clock signal CLK 1, and sequentially outputs the acquired original image data of the image P3 to the selecting unit 202 at the timing synchronized with a clock signal CLKI. Then, the selecting unit 202 sequentially outputs the original image data of the input image P3 to the pre-processing unit 203 at the timing synchronized with the clock signal CLKI.

The pre-processing unit 203 pre-processes the original image data of the image P3 sequentially input from the selecting unit 202. The pre-processing unit 203 sequentially outputs pre-processed image data of an image P4 after pre-processing has been performed to the first data transfer unit 204 at the timing synchronized with the clock signal CLKI. Then, the first data transfer unit 204 transfers (writes) the pre-processed image data of the image P4 sequentially input from the pre-processing unit 203 to the DRAM 601 via the DRAM controller 600 at the timing synchronized with the clock signal CLKI. Thereby, the pre-processed image data of the image P4 after the pre-processing has been performed is stored in the DRAM 601.

In this manner, in the operation of the second pass, based on the internal timing of the imaging-processing unit 200, the pre-processed image data of the image P4 obtained by pre-processing the image P3 of the right half of the image P1 output by the image sensor 100 and stored in the DRAM 601 is stored in the DRAM 601. Thereby, the pre-processed image data (the pre-processed image data of the image P2+the image P4) obtained by pre-processing the input image data of the entire region of one image P1 captured by the image sensor 100 is stored in the DRAM 601.

In this manner, in the imaging device 10, the left half region of the image P1 output by the image sensor 100 is pre-processed based on the timing of the image sensor 100 in the operation of the first pass, and the right half region of the image P1 output by the image sensor 100 is pre-processed based on the internal timing of the imaging-processing unit 200 in the operation of the second pass. At this time, the imaging device 10 adjusts the frequency of the clock signal CLKI in the operation of the second pass to a frequency at which the imaging-processing unit 200 can complete the pre-processing on the image data. Thereby, the imaging device 10 can average the access to the DRAM 601 in the operation of the second pass and prevent pressure from being imposed on the bus bandwidth of the data bus 800 due to concentration of image data flowing through the data bus 800 in the operation of the second pass in a partial period.

Next, an example of the bus bandwidth of the data bus 800 in the imaging device 10 will be described. In the following description, the bus bandwidth when an operation is performed based on the timing of the image sensor 100 even in the operation of the second pass will also be described for ease of understanding of the effect of suppressing pressure on the bus bandwidth using the imaging device 10.

Figure 4:
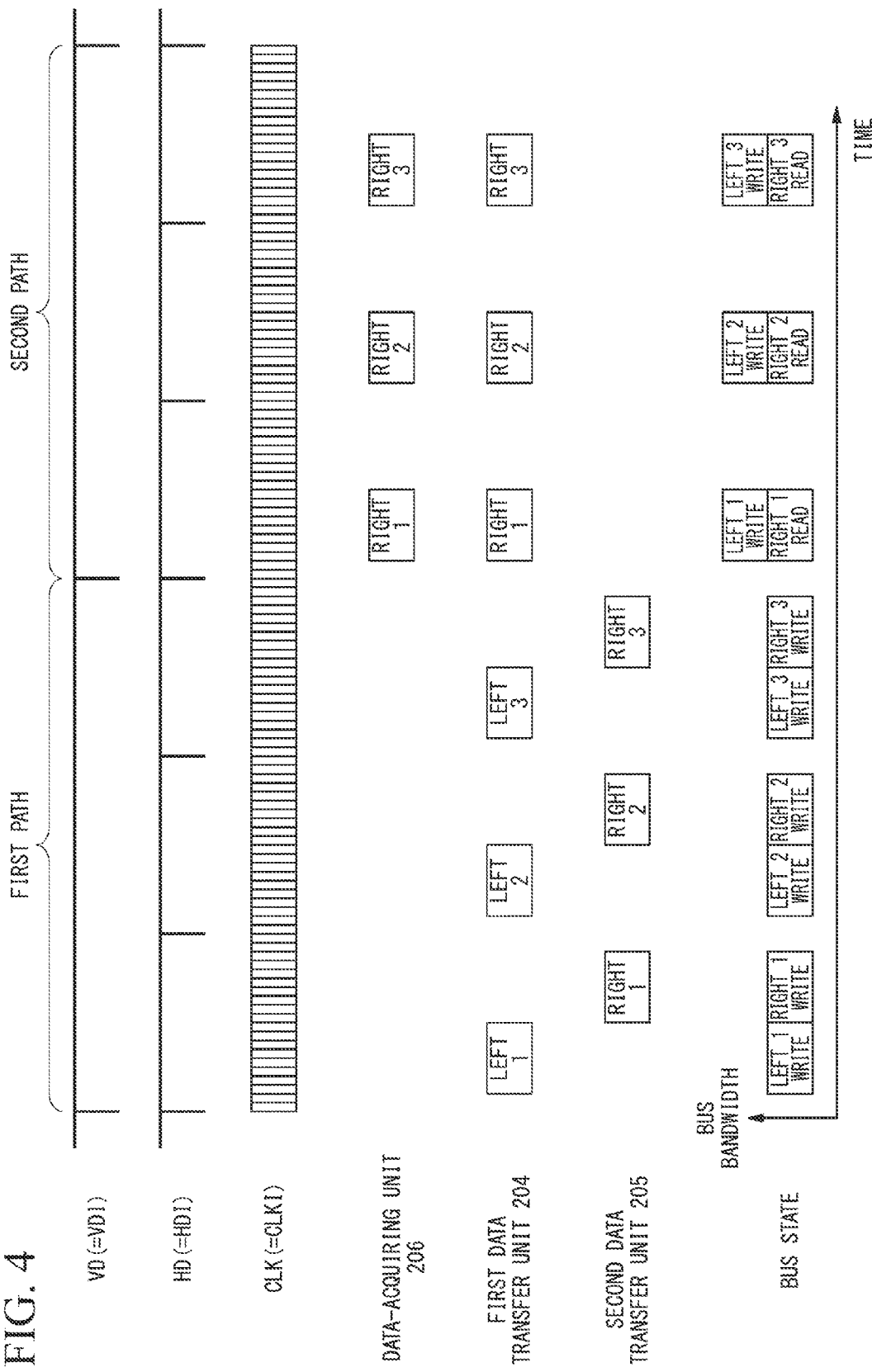
FIG. 4 is a timing chart illustrating an example of timings in an operation in which access to a dynamic random access memory (DRAM) is not leveled in the imaging device according to the first embodiment.
Figure 5:
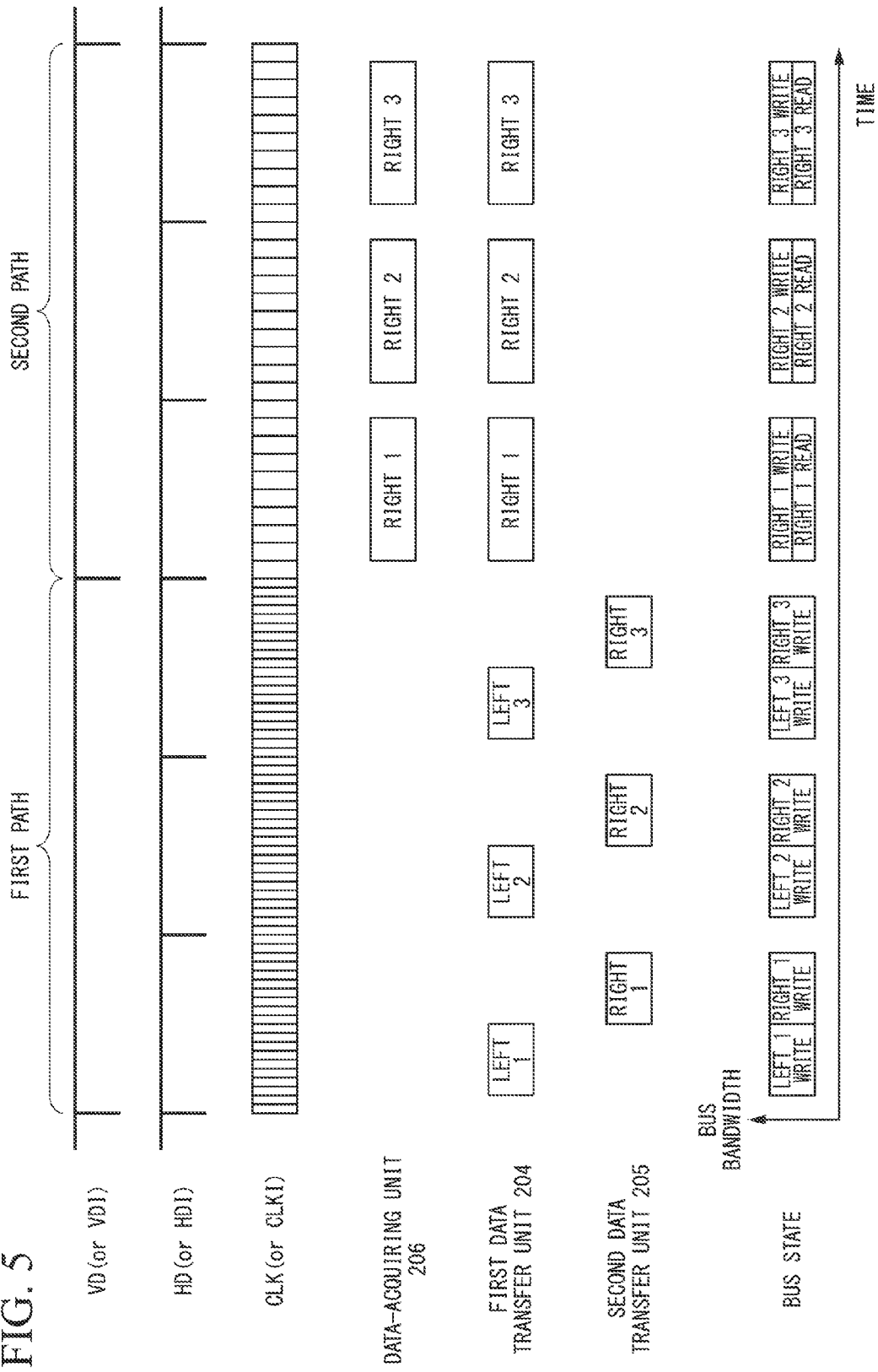
FIG. 5 is a timing chart illustrating an example of timings in an operation in which access to the DRAM is leveled in the imaging device according to the first embodiment.

Each of FIGS. 4 and 5 is a timing chart illustrating an example of access to the DRAM 601 in the imaging device 10 according to the first embodiment. In FIG. 4, an example of the operation timing when the imaging device 10 does not average the bus bandwidth at the time of accessing the DRAM 601 is schematically illustrated. In addition, in FIG. 5, an example of the operation timing when the imaging device 10 averages the bus bandwidth at the time of accessing the DRAM 601 is schematically illustrated. The timing charts illustrated in FIGS. 4 and 5 are those when input image data of three rows is pre-processed. Thus, in FIGS. 4 and 5, the data-acquiring unit 206 specifies a number representing a row of the input image data subsequent to "left" or "right" representing the region of the image corresponding to each of the first data transfer unit 204 and the second data transfer unit 205.

First, an operation in which the bus bandwidth at the time of accessing the DRAM 601 is not averaged will be described using FIG. 4. According to the operation illustrated in FIG. 4, the imaging-processing unit 200 performs pre-processing based on the timing of the clock signal CLK input from the image sensor 100. As a result, the bus bandwidth when accessing the DRAM 601 is not averaged. Therefore, this is the same as an operation in the conventional imaging device.

The image sensor 100 performs raster scanning on pixels provided in the image sensor 100 itself according to a horizontal synchronization signal HD and a vertical synchronization signal VD input from the imaging-processing unit 200, and sequentially outputs input image data of a row of pixels of the horizontal direction for an image to the imaging-processing unit 200 for every horizontal synchronization signal HD. In the operation illustrated in FIG. 4, the imaging-processing unit 200 operates based on the timing of the clock signal CLK input from the image sensor 100 in the entire period because the bus bandwidth at the time of accessing the DRAM 601 is not averaged.

In the first operation (the operation of the first pass), the first data transfer unit 204 transfers (writes) the pre-processed image data obtained by pre-processing the input image data of the left half region of the image P1 in real time to the DRAM 601 and the second data transfer unit 205 transfers (writes) the input image data of the right half region of the image P1 as the original image data to the DRAM 601 without change. At this time, because the input image data of one row is sequentially input from the image sensor 100 as described above, access by the first data transfer unit 204 to the DRAM 601 and access by the second data transfer unit 205 to the DRAM 601 are performed without overlapping within a period of the same horizontal synchronization signal HD as illustrated in FIG. 4. That is, in the operation of the first pass, the transfer (writing) of the pre-processed image data corresponding to the input image data of the same row to the DRAM 601 and the transfer (writing) of the original image data to the DRAM 601 are performed within the same period without overlapping. Thus, the bus bandwidth of the data bus 800 is constant within the period of each horizontal synchronization signal HD as illustrated in FIG. 4.

For example, the case in which the number of pixels of the horizontal direction of the image sensor 100 is one million pixels, that is, the case in which the image sensor outputs input image data obtained by capturing an image having a width of one million pixels to the imaging-processing unit 200, is considered. In this case, in the operation of the first pass, the first data transfer unit 204 transfers pre-processed image data of a half million pixels to the DRAM 601 and the second data transfer unit 205 transfers original data of a half million pixels to the DRAM 601. Thus, in the operation of the first pass, a constant bus bandwidth of the data bus 800 through which image data of a half million pixels passes is used in the period of each horizontal synchronization signal HD.

In addition, in the second operation (the operation of the second pass), the data-acquiring unit 206 acquires (reads) the original image data of the right half region of the image P1 from the DRAM 601, and the first data transfer unit 204 transfers (writes) the pre-processed image data obtained by pre-processing the original image data of the right half region of the image P1 in real time to the DRAM 601. Thus, in the operation of the second pass, as illustrated in FIG. 4, access by the data-acquiring unit 206 to the DRAM 601 and access by the first data transfer unit 204 to the DRAM 601 overlap and are performed within the period of the same horizontal synchronization signal HD. That is, in the operation of the second pass, there is a period in which the acquisition (reading) of the original image data from the DRAM 601 and the transfer (writing) of the pre-processed image data corresponding to the acquired original image data to the DRAM 601 are concentrated. Thus, in the imaging device 10, pressure is imposed on the bus bandwidth of the period in which access to the DRAM 601 is concentrated and a processing time of another component provided in the imaging device 10 is lengthened or its operation is impossible and therefore implementation of various functions to be executed by the imaging device 10 is considered to be difficult.

For example, the case in which the number of pixels of the horizontal direction of the image sensor 100 is one million is considered. In this case, in the operation of the second pass, the data-acquiring unit 206 acquires pre-processed image data of a half million pixels from the DRAM 601 and the first data transfer unit 204 transfers the pre-processed image data of the half million pixels to the DRAM 601. Even in the operation of the second pass, a total bus bandwidth within the period of the same horizontal synchronization signal HD is similar to that in the operation of the first pass. However, in the period in which access to the DRAM 601 concentrates in the operation of the second pass, image data of one million pixels passes through the data bus 800. That is, because there is a period in which an amount of image data in the operation of the second pass is twice that in the operation of the first pass, a bus bandwidth which is twice that of the operation of the first pass is necessary and pressure is imposed on the bus bandwidth of the data bus 800 in the operation of the second pass rather than the operation of the first pass. Thus, in the period in which the pressure is imposed on the bus bandwidth, an operation of another component provided in the imaging device 10 is likely to be limited.

A clock signal by which the image sensor 100 or the imaging-processing unit 200 operates is set to have a high rate, that is, a frequency of a clock signal CLK is set to be high, so that pressure on the bus bandwidth of the data bus 800 is also considered to be suppressed. However, this case is undesirable because another problem such as an increase of power consumption or an increase of an amount of heat generation occurs due to a high-speed operation.

Next, an operation in which the bus bandwidth is averaged at the time of accessing the DRAM 601 will be described using FIG. 5. The operation illustrated in FIG. 5 is an operation of the imaging device 10 according to the first embodiment in which the imaging-processing unit 200 averages the bus bandwidth at the time of accessing the DRAM 601 by performing pre-processing based on the timing of the clock signal CLKI generated by the PLL 2011 as the internal timing.

As in the operation illustrated in FIG. 4, the image sensor 100 sequentially outputs input image data of a row of pixels of the horizontal direction for an image to the imaging-processing unit 200 for every horizontal synchronization signal HD input from the imaging-processing unit 200. Because the bus bandwidth at the time of accessing the DRAM 601 is averaged in the operation illustrated in FIG. 5, the operation is performed based on the timing of the clock signal CLK input from the image sensor 100 in the first operation (the operation of the first pass) and the operation is performed based on the timing of the clock signal CLKI generated by the PLL 2011 in the second operation (the operation of the second pass) as described using FIGS. 2 and 3.

In the following description, for ease of description, a frequency of the clock signal CLK1 at which the imaging-processing unit 200 operates as a reference in the second operation (the operation of the second pass) will be described as being ½ of a frequency of the clock signal CLK input from the image sensor 100 at which the imaging-processing unit 200 operates as a reference in the first operation (the operation of the first pass) as an example. That is, a cycle of the clock signal CLKI will be described as being twice that of the clock signal CLK as an example. In addition, for ease of description, as an example, cycles of the vertical synchronization signal VDI and the horizontal synchronization signal HDI to be used when the imaging-processing unit 200 pre-processes the original image data in the second operation (the operation of the second pass) will be described as being the same as cycles of the vertical synchronization signal VD and the horizontal synchronization signal HD to be used when the imaging-processing unit 200 pre-processes the input image data in real time in the first operation (the operation of the first pass).

Because the first operation (the operation of the first pass) is similar to the first operation (the operation of the first pass) illustrated in FIG. 4, detailed description thereof will be omitted.

In the second operation (the operation of the second pass), as in the second operation (the operation of the second pass) illustrated in FIG. 4, the data-acquiring unit 206 acquires (reads) the original image data of the right half region of the image P1 from the DRAM 601, and the first data transfer unit 204 transfers (writes) the pre-processed image data obtained by pre-processing the original image data of the right half region of the image P1 in real time to the DRAM 601. Thus, in the operation of the second pass, as in the second operation (the operation of the second pass) illustrated in FIG. 4, access by the data-acquiring unit 206 to the DRAM 601 and access by the first data transfer unit 204 to the DRAM 601 overlap and are performed within the period of the same horizontal synchronization signal HDI. However, because the imaging-processing unit 200 performs pre-processing based on the timing of the clock signal CLKI having a frequency which is ½ of a frequency of the clock signal CLK in the second operation (the operation of the second pass) as described above, a processing time in the second operation (the operation of the second pass) is doubled as illustrated in FIG. 5. Accordingly, in the operation of the second pass, each of the acquisition (reading) of the original image data from the DRAM 601 and the transfer (writing) of the pre-processed image data corresponding to the acquired original image data to the DRAM 601 is distributed and averaged within the period of the horizontal synchronization signal HDI. Thereby, in the imaging device 10, the bus bandwidth of the data bus 800 is halved and pressure on the bus bandwidth can be suppressed.

For example, the case in which the number of pixels of the horizontal direction of the image sensor 100 is one million pixels is considered. In this case, in the operation of the second pass illustrated in FIG. 5, the data-acquiring unit 206 acquires pre-processed image data of a half million pixels from the DRAM 601, and the first data transfer unit 204 transfers the pre-processed image data of the half million pixels to the DRAM 601. Even in the operation of the second pass, a total bus bandwidth within the period of the same horizontal synchronization signal HD is similar to that in the operation of the first pass. However, in the operation of the second pass, access to the DRAM 601 is distributed and a peak of the bus bandwidth is equivalent to that in the operation of the first pass so as to pre-process original data using the entire period of the horizontal synchronization signal HD because the frequency of the clock signal CLKI is ½. That is, in the operation of the second pass illustrated in FIG. 5, pressure on the bus bandwidth of the data bus 800 as in the operation of the second pass illustrated in FIG. 4 can be avoided.

As described above, the imaging device 10 according to the first embodiment pre-processes all input image data of one input row through two operations, i.e., the first and second operations, when a data amount of input image data of the horizontal direction output by the image sensor 100 every row is greater than a data amount of image data of one row capable of being held by the line memory provided in the pre-processing unit 203 within the imaging-processing unit 200. At this time, in the imaging device 10 according to the first embodiment, an operation is performed based on the timing of the image sensor 100 in the first operation of performing pre-processing in real time so as to process all input image data input from the image sensor 100 without loss. In addition, in the imaging device 10 according to the first embodiment, it is possible to perform pre-processing at a timing different from that of the image sensor 100 because original image data to be pre-processed is stored in the DRAM 601 in the second operation. In the imaging device 10 according to the first embodiment, in the second operation, an operation is performed based on the timing of the clock signal CLKI generated by the PLL 2011 as the internal timing of the imaging-processing unit 200. More specifically, in the first operation (the operation of the first pass), the imaging device 10 transfers (writes) pre-processed image data obtained by pre-processing the input image data of the left half of the input image P1 in real time to the DRAM 601 based on the clock signal CLK input from the image sensor 100, and transfers (writes) the input image data of the right half which is not capable of being pre-processed to the DRAM 601 without change. Thereafter, in the second operation (the operation of the second pass), the imaging device 10 pre-processes all input image data of one image P1 by transferring the pre-processed image data obtained by pre-processing the input image data of the right half of the image P1 which has not been pre-processed in the first operation (the operation of the first pass) based on the timing of the clock signal CLKI generated by the PLL 2011 to the DRAM 601.

Thereby, in the imaging device 10 according to the first embodiment, it is possible to average the bus bandwidth of the data bus 800 in the period in which an operation is performed based on the internal timing of the imaging-processing unit 200 and pre-process all image data output from the image sensor 100 in a state in which pressure on the bus bandwidth in which operations of other components provided in the imaging device 10 are limited is suppressed. Thereby, in the imaging device 10 according to the first embodiment, each component provided in the imaging device 10 can efficiently use the data bus 800.

In addition, in the imaging device 10 according to the first embodiment, it is possible to pre-process all image data output from the image sensor 100 even when a data amount of image data of one row capable of being held by the line memory provided in the pre-processing unit 203 within the imaging-processing unit 200 is less than a data amount of input image data output by the image sensor 100 every row.

That is, it is possible to execute pre-processing corresponding to the image sensor 100 in which the number of pixels has been increased without increasing a circuit scale of the imaging device 10, particularly, the storage capacity of the line memory. In other words, it is possible to cope with an increase of the number of pixels of the image sensor in a small circuit scale.

In addition, in the imaging device 10 according to the first embodiment, the timing of an operation in a period in which the operation is performed based on the internal timing of the imaging-processing unit 200, that is, a period of the second operation, is set to be late. Thereby, in the imaging device 10 according to the first embodiment, it is possible to expect an advantageous effect such as the reduction of power consumption or an amount of heat generation due to an operation at a low speed. In an example of the timing chart of a pre-processing operation by the imaging device 10 according to the first embodiment illustrated in FIG. 5, the case in which the frequency of the clock signal CLKI generated by the PLL 2011 is set to ½ of the frequency of the clock signal CLK input from the image sensor 100 has been described. However, the frequency of the clock signal CLKI generated by the PLL 2011 serving as the reference in the period of the second operation is not limited to the example illustrated in FIG. 5. It is desirable to set the frequency within an allowed range to implement the performance of the imaging device 10. In this case, the frequency of the clock signal CLKI may be a predetermined frequency, and, for example, may be properly changed according to operations of various functions to be executed by the imaging device 10.

In addition, in the imaging device 10 according to the first embodiment, it is possible to prevent the vertical synchronization signal VD and the horizontal synchronization signal HD for driving the image sensor 100 from being output to the image sensor 100 during the period of the second operation in which the imaging-processing unit 200 operates based on the internal timing. Thereby, in the imaging device 10 according to the first embodiment, the state can be set to be equivalent to that in which the image sensor 100 is disconnected from the imaging-processing unit 200 during a period of the second operation in which pre-processing can be performed at the timing different from that of the image sensor 100. That is, the state can be controlled to that in which the operation of the image sensor 100 is stopped. Thereby, in the imaging device 10 according to the first embodiment, the power consumption of the image sensor 100 can also be reduced.

In the example of the pre-processing operation by the imaging device 10 according to the first embodiment illustrated in FIGS. 2 and 3, the case in which the input image data input from the image sensor 100 is pre-processed in halves through two separate operations has been described. However, in actual pre-processing, disharmony may be likely in a boundary part along which image processing is divided when an image is divided and processed in one place. Thus, when the pre-processing is divided and performed, it is general to perform a process by setting a region in which image data to be used in each process overlaps, that is, an overlap region. Even in the pre-processing by the imaging device 10 according to the first embodiment, likewise, a process of setting the overlap region can be performed.

In addition, in the example of the pre-processing operation by the imaging device 10 according to the first embodiment illustrated in FIGS. 2 and 3, the example in which input image data of a left half region of the image P1 input from the image sensor 100 is pre-processed in the first operation (the operation of the first pass) and input image data of a right half region (image P3) of the image P1 input from the image sensor 100 is pre-processed in the second operation (the operation of the second pass) has been described. However, a region of an image to be pre-processed in each of the first operation (the operation of the first pass) and the second operation (the operation of the second pass) is not limited to the order illustrated in FIGS. 2 and 3. For example, the input image data of the right half region of the image P1 may be pre-processed in the first operation (the operation of the first pass) and the input image data of the left half region of the image P1 may be pre-processed in the first operation (the operation of the second pass).

In addition, in the example of the operation of the pre-processing by the imaging device 10 according to the first embodiment illustrated in FIGS. 2 and 3, the case in which the input image data input from the image sensor 100 is pre-processed through two separate operations has been described. However, the number of operations of pre-processing input image data of one image is not limited to two as described above, and may be 3 or more. Because the operation in which the number of operations into which pre-processing is divided is different can also be considered to be similar to an operation (an operation of pre-processing of the imaging device 10 according to the first embodiment illustrated in FIGS. 2 and 3) in which the pre-processing is performed through two separate operations, detailed description thereof will be omitted.

In addition, in the example of the timing chart of the pre-processing operation by the imaging device 10 according to the first embodiment illustrated in FIG. 5, the case in which the frequency of the clock signal CLKI in the second operation is set to ½ of the frequency of the clock signal CLK in the first operation and the cycles of the vertical synchronization signal VDI and the horizontal synchronization signal HDI in the second operation are set to be the same as those of the vertical synchronization signal VD and the horizontal synchronization signal HD in the first operation has been described. That is, in the imaging device 10 according to the first embodiment, the case in which the cycles of the vertical synchronization signal VDI and the horizontal synchronization signal HDI to be used when the imaging-processing unit 200 pre-processes original image data in the second operation (the operation of the second pass) are the same as those of the vertical synchronization signal VD and the horizontal synchronization signal HD to be used when the imaging-processing unit 200 pre-processes the input image data in real time in the first operation (the operation of the first pass) has been described. However, the cycles of the vertical synchronization signal VDI and the horizontal synchronization signal HDI generated by the synchronization signal-generating unit 2013 serving as the reference in the period of the second operation are not limited to the example illustrated in FIG. 5. It is desirable for the cycles of the generated vertical synchronization signal VDI and horizontal synchronization signal HDI to be within the range allowed to implement the performance of the imaging device 10. For example, the cycles of the vertical synchronization signal VDI and the horizontal synchronization signal HDI in the second operation can also be set to be twice as long as the cycles of the vertical synchronization signal VD and the horizontal synchronization signal HD in the first operation, respectively. In this case, for example, it is possible to set the frequency of the clock signal CLKI to ¼, set all the periods of the vertical synchronization signal VDI and the horizontal synchronization signal HDI which have been doubled to periods of the second operation of pre-processing original image data. As a result, an advantageous effect of further suppressing pressure on the bus bandwidth and further reducing power consumption or an amount of heat generation can be expected.

The operation of pre-processing in the imaging device 10 according to the first embodiment need not necessarily be divided into two or more operations. For example, the pre-processing unit 203 can perform the pre-processing at once when the number of pixels of the horizontal direction of the image sensor mounted on the imaging device is less than the storage capacity of the line memory provided in the pre-processing unit 203 within the imaging-processing unit 200. That is, when an input data amount of input image data is less than an amount of data capable of being pre-processed by the pre-processing unit 203. Therefore, the pre-processing need not necessarily be divided into the two or more operations. In this manner, it is possible to change the number of operations of pre-processing by the pre-processing unit 203 according to the number of pixels of the horizontal direction of the image sensor mounted on the imaging device.

In addition, in general, the image sensor can be driven in a plurality of driving modes such as a driving mode (hereinafter referred to as a "full-pixel output mode") in which all pixel signals are output and a driving mode (hereinafter referred to as a "pixel addition mode") in which pixel signals are added and output. The full-pixel output mode is set when a high-resolution image such as a still image is captured. The pixel addition mode is set when photographing of a so-called live view function of causing a moving image for viewing a subject to be photographed to be displayed on a display device is performed. Thus, for example, the image sensor 100 is driven in the pixel addition mode and pixel signals are added in the horizontal direction, so that a data amount of image data of one row to be output by the image sensor 100 is less than a data amount of image data of one row capable of being held by the line memory provided in the pre-processing unit 203 within the imaging-processing unit 200 such as that an image width becomes ½. Even in this case, the pre-processing need not necessarily be divided into two operations because the pre-processing unit 203 can perform the pre-processing at once. In this manner, it is possible to change the number of operations in which the pre-processing unit 203 performs the pre-processing according to an image to be captured based on a driving mode of the image sensor mounted on the imaging device. For example, pre-processing can be performed through two separate operations when driving is performed in the full-pixel output mode, that is, during a mode in which the still image is captured. For example, the pre-processing can be performed at once in real time when driving is performed in the pixel addition mode, that is, during a mode in which a moving image or a live view is captured.

In the first embodiment, the case in which the image sensor 100 outputs a pixel signal subjected to raster scanning in the horizontal direction on an image as image data has been described. However, for example, when the image sensor outputs a pixel signal subjected to raster scanning in the horizontal direction on an image as image data the concept of the present invention is similarly applied by considering the horizontal direction in the first embodiment as the vertical direction, that is, considering the horizontal direction and the vertical direction of the image inversely. In addition, although the case in which pre-processing is performed through a plurality of separate operations by dividing the image input from the image sensor 100 in the horizontal direction has been described in the first embodiment, the concept of the present invention is similarly applied by considering the horizontal direction and the vertical direction of the image inversely even when the pre-processing is performed through a plurality of separate operations by dividing the image input from the image sensor 100 in the vertical direction.

The imaging device may be configured to include a signal-processing unit configured to output processed data obtained by executing various processes other than pre-processing within the imaging-processing unit. For example, the imaging device may be configured to include an evaluation value-generating unit configured to generate an evaluation value for performing control related to photographing in the imaging device as processed data. Here, control of auto exposure (AE), auto white balance (AWB), auto focus (AF), etc. is considered as control related to photographing. At this time, various images are considered as an image for generating an evaluation value, and, for example, an image of a wide dynamic range or the like obtained by combining a plurality of images obtained by changing exposure conditions of the image sensor is considered. In this case, the evaluation value-generating unit generates the evaluation value from the image of the wide dynamic range generated by combining the images.

Second Embodiment

Next, an imaging device according to the second embodiment will be described. Only the imaging-processing unit 200 provided in the imaging device 10 according to the first embodiment illustrated in FIG. 1 is different from that of the imaging device according to this second embodiment. Accordingly, in description of the imaging device according to this second embodiment, the same reference numerals are assigned to components similar to those of the imaging device 10 according to the first embodiment, only components and operations different from those of the imaging device 10 according to the first embodiment will be described, and detailed description related to components and operations similar to those of the imaging device 10 according to the first embodiment will be omitted.

Figure 6:
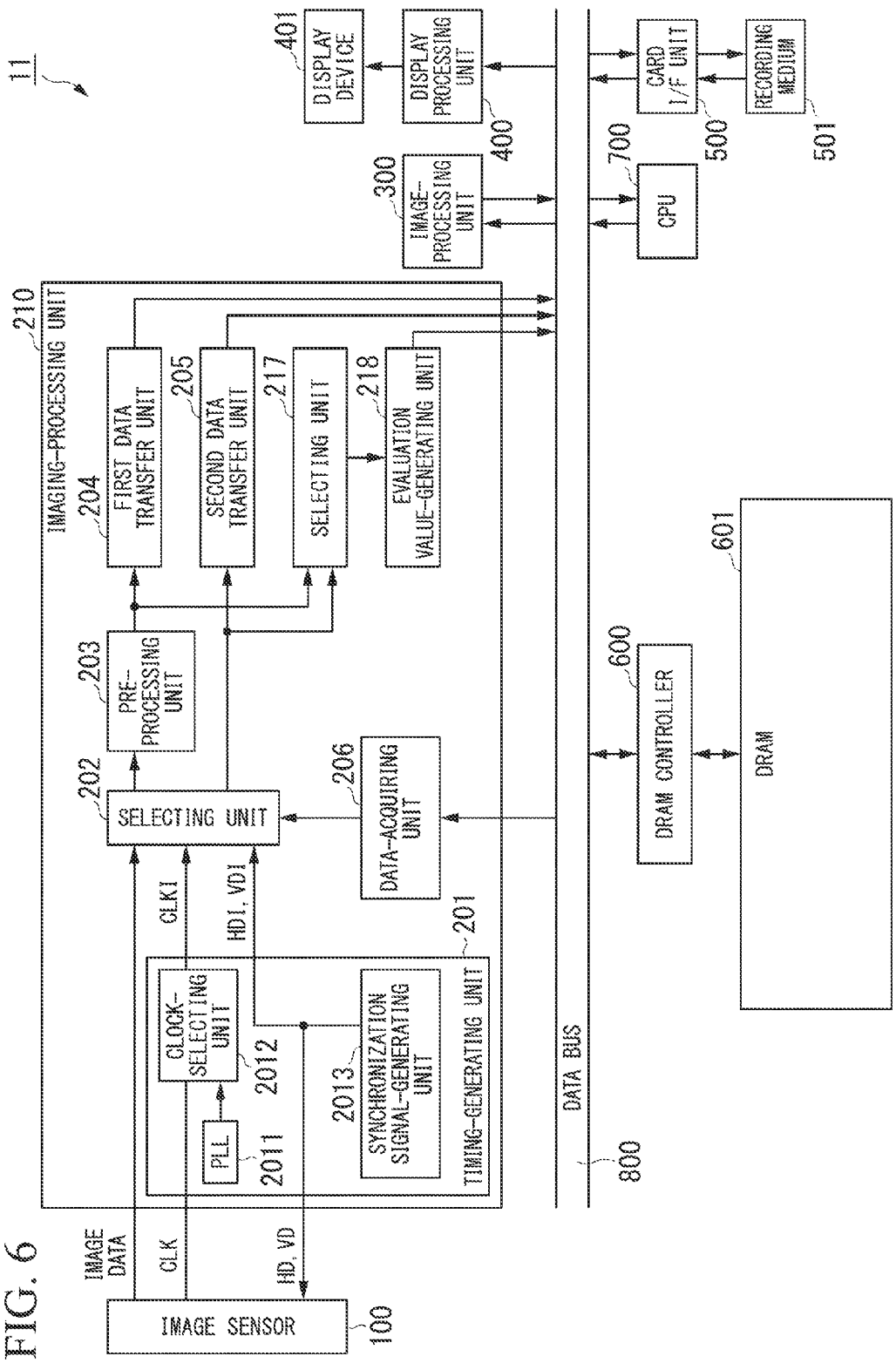
FIG. 6 is a block diagram illustrating a schematic configuration of the imaging device in a second embodiment of the present invention.

FIG. 6 is a block diagram illustrating a schematic configuration of the imaging device in this second embodiment of the present invention. The imaging device 11 illustrated in FIG. 6 includes an image sensor 100, an imaging-processing unit 210, an image-processing unit 300, a display processing unit 400, a display device 401, a card I/F unit 500, a recording medium 501, a DRAM controller 600, a DRAM 601, and a CPU 700. In addition, the imaging-processing unit 210 within the imaging device 11 includes a timing-generating unit 201, a selecting unit 202, a pre-processing unit 203, a first data transfer unit 204, a second data transfer unit 205, a data-acquiring unit 206, a selecting unit 217, and an evaluation value-generating unit 218. In addition, the timing-generating unit 201 within the imaging-processing unit 210 includes a PLL 2011, a clock-selecting unit 2012, and a synchronization signal-generating unit 2013.

As in the imaging device 10 according to the first embodiment, each of the imaging-processing unit 210, the image-processing unit 300, the display processing unit 400, the card I/F unit 500, the DRAM controller 600, and the CPU 700 within the imaging device 11 is connected via the data bus 800. For example, reading of data from the DRAM 601 connected to the DRAM controller 600 through DMA and writing of data to the DRAM 601 are performed.

The image sensor 100 performs raster scanning on pixels provided in the image sensor 100 itself according to a horizontal synchronization signal HD and a vertical synchronization signal VD input from the imaging-processing unit 210, and sequentially outputs a pixel signal according to subject light as image data to the imaging-processing unit 200 in the horizontal direction with respect to the image at the timing of a clock signal CLK. In addition, the image sensor 100 outputs the clock signal CLK, which is the timing at which image data of each pixel is output, to the imaging-processing unit 210.

Like the imaging-processing unit 200 provided in the imaging device 10 according to the first embodiment, the imaging-processing unit 210 fetches image data input from the image sensor 100. The imaging-processing unit 210 transfers (writes) pre-processed image data obtained by pre-processing the fetched input image data to the DRAM 601 via the DRAM controller 600, and transfers (writes) input image data which is not capable of being pre-processed to the DRAM 601 via the DRAM controller 600 without change. In addition, like the imaging-processing unit 200 provided in the imaging device 10 according to the first embodiment, the imaging-processing unit 210 outputs a synchronization signal for driving the image sensor 100 to the image sensor 100 according to a state when the imaging-processing unit 200 performs pre-processing.

In addition, the imaging-processing unit 210 includes an evaluation value-generating unit 218 as a signal-processing unit configured to output processed data by performing a process other than pre-processing. Based on the image data stored in the DRAM 601, the imaging-processing unit 210 generates the evaluation value for controlling photographing in the imaging device 11 as processed data based on the image data stored in the DRAM 601, and transfers (writes) the generated evaluation value to the DRAM 601 via the DRAM controller 600. In the following description, the imaging-processing unit 210 will be described as a configuration in which an evaluation value (hereinafter referred to as an "AE evaluation value") of AE and an evaluation value (hereinafter referred to as an "AWB evaluation value") of AWB are generated.

The selecting unit 202 selects either or both of the pre-processing unit 203 and the second data transfer unit 205 as the output destinations of the image data output from the image sensor 100 and the image data input from the data-acquiring unit 206. The selecting unit 202 outputs the input image data to the selected output destination(s). Image data to be output from the selecting unit 202 to the second data transfer unit 205 is also output to the selecting unit 217. In addition, the selecting unit 202 selects components of the output destinations of the horizontal synchronization signal HDI, the vertical synchronization signal VDI, and the clock signal CLKI input from the clock-selecting unit 2012, and outputs the signals to the selected components.

The pre-processing unit 203 outputs pre-processed data obtained by performing various pre-processing on image data input from the selecting unit 202 based on the horizontal synchronization signal HDI, the vertical synchronization signal VDI, and the clock signal CLKI input from the selecting unit 202 to the first data transfer unit 204 and the selecting unit 217.

The selecting unit 217 selects image data to be input to the evaluation value-generating unit 218. More specifically, the selecting unit 217 outputs either of pre-processed image data input from the pre-processing unit 203 and image data input from the selecting unit 202 to the evaluation value-generating unit 218.

The evaluation value-generating unit 218 calculates (generates) the AE evaluation value for controlling exposure when the imaging device 11 performs photographing based on the image data input from the selecting unit 217. In addition, the evaluation value-generating unit 218 calculates (generates) an AWB evaluation value for controlling white balance when the imaging device 11 performs photographing based on image data input from the selecting unit 217. Then, the evaluation value-generating unit 218 transfers (writes) the generated AE evaluation value and AWB evaluation value to the DRAM 601 via the DRAM controller 600. A configuration of the evaluation value-generating unit 218 or a method of calculating each evaluation value and an operation in the evaluation value-generating unit 218 are similar to a configuration or an evaluation value calculation method and an operation of an evaluation value-generating unit provided in a conventional imaging device. Accordingly, detailed description related to the configuration, the evaluation value calculation method and the operation of the evaluation value-generating unit 218 will be omitted.

The evaluation value generated by the evaluation value-generating unit 218 is not limited to the AE evaluation value or the AWB evaluation value. For example, it is only necessary for the evaluation value to be an evaluation value for controlling photographing in the imaging device 11 such as an evaluation value (hereinafter referred to as an "AF evaluation value") of AF.

The image-processing unit 300 acquires (reads) pre-processed image data stored in the DRAM 601. The image-processing unit 300 generates display image data or recording image data by performing various image processing such as a noise cancelation process, distortion aberration correction, a YC conversion process, a resizing process, a Joint Photographic Experts Group (JPEG) compression process, and a moving image compression process such as a Moving Picture Experts Group (MPEG) compression process or an H.264 compression process on the acquired pre-processed image data. Then, the image-processing unit 300 stores (writes) the generated display image data or recording image data in (to) the DRAM 601 again.

In addition, the image-processing unit 300 acquires (reads) the recording image data stored in the DRAM 601 and generates the display image data by performing various types of image processing such as a JPEG decompression process and a moving image decompression process such as an MPEG decompression process or an H.264 decompression process. Then, the image-processing unit 300 stores (writes) the generated display image data in (to) the DRAM 601 again.

In addition, the image-processing unit 300 acquires (reads) a plurality of pieces of pre-processed image data stored in the DRAM 601. The image-processing unit 300 generates a combined image by performing an image combining process of combining the acquired pre-processed image data, that is, combining a plurality of images. Then, the image-processing unit 300 stores (writes) image data of the generated combined image in (to) the DRAM 601 again.

The display processing unit 400 acquires (reads) the display image data stored in the DRAM 601, and performs a display process such as a process of superimposing on-screen display (OSD) display data on the acquired display image data. Then, the display processing unit 400 outputs image data after the display process to the display device 401.

The display device 401 is a display device such as a thin film transistor (TFT) liquid crystal display (LCD) or an organic electro luminescence (EL) display, and displays an image according to image data after the display process output from the display processing unit 400.

The display device 401 may be a display device such as an electronic view finder (EVF) or an external display such as a television. In addition, although the display device 401 also serves as a component of the imaging device 10 in FIG. 6, the display device 401 may be a configuration detachable from the imaging device 11.

The card I/F unit 500 acquires (reads) the recording image data recorded on the DRAM 601 and causes the acquired recording image data to be recorded on the recording medium 501. In addition, the card I/F unit 500 reads the image data recorded on the recording medium 501 and transfers (writes) the read image data to the DRAM 601.

The recording medium 501 is a recording medium such as a Secure Digital (SD) memory card or CompactFlash (CF) (registered trademarks), and records recording image data output from the card I/F unit 500. In addition, image data recorded is read out by the card I/F unit 500. Although the recording medium 501 also serves as a component of the imaging device 11 in FIG. 6, the recording medium 501 is a configuration detachable from the imaging device 11.

The CPU 700 controls a component of the imaging device 11, that is, the overall imaging device 11.

For example, the CPU 700 controls an operation of each component within the imaging device 11 according to a photographing operation or a reproducing operation in the imaging device 11. For example, when the imaging device 11 performs a photographing operation, the CPU 700 controls the start of outputting of image data from the image sensor 100 and the start of fetching of image data by the imaging-processing unit 210.

In addition, the CPU 700 performs the control of selection of an output destination of image data by the selecting unit 202 within the imaging-processing unit 210, the setting of a transfer of imaging data by the first data transfer unit 204 and the second data transfer unit 205, the setting of the data-acquiring unit 206, the control of selection of image data output by the selecting unit 217 to the evaluation value-generating unit 218, or the control of generation of an evaluation value by the evaluation value-generating unit 218.

Through this configuration, in the imaging device 11 according to this second embodiment, as in the imaging device 10 according to the first embodiment, it is possible to perform various direct pre-processing on image data input in real time and various pre-processing on image data stored in the DRAM 601. In addition, in the imaging device 11 according to this second embodiment, it is possible to generate an evaluation value for controlling photographing in the imaging device 11 based on image data stored in the DRAM 601 acquired by the data-acquiring unit 206 in addition to various pre-processing.

Although the case in which the pre-processing unit 203 and the evaluation value-generating unit 218 are different components in the imaging device 11 illustrated in FIG. 6 has been described, the different components may be configured as one signal-processing unit having the function of the pre-processing unit 203 and the function of the evaluation value-generating unit 218. Then, for example, there may be a configuration in which the first data transfer unit 204 stores (writes) pre-processed image data in (to) the DRAM 601 and the second data transfer unit 205 transfers (writes) an AE evaluation value or an AWB evaluation value to the DRAM 601. In addition, in the imaging device 11, a configuration can also be made to include a third data transfer unit configured to transfer (write) the AE evaluation value or the AWB evaluation value to the DRAM 601. In this case, a configuration including a selecting unit configured to output the pre-processed image data and the AE evaluation value or the AWB evaluation value to corresponding data transfer units is considered.

Next, an example of an operation of pre-processing image data output from the image sensor 100 and an operation of generating the evaluation value in the imaging device 11 will be described. In the following description, an example in which the evaluation value is generated based on image data of two images captured by changing an exposure condition of the image sensor 100 will be described. The exposure condition of the image sensor 100 indicates an exposure time for obtaining image data and is defined as a short exposure time (hereinafter referred to as "short exposure") and a long exposure time (hereinafter referred to as "long exposure") for ease of description. In addition, in the following description, for ease of description, the case in which the number of pixels of the horizontal direction of the image sensor 100 is less than the number of pixels of the horizontal direction in which the pre-processing unit 203 provided in the imaging-processing unit 210 performs pre-processing at once will be described. That is, an operation in which a data amount of input image data of the horizontal direction output by the image sensor 100 for every row is less than a data amount of image data of one row capable of being held by the line memory provided in the pre-processing unit 203 and the pre-processing unit 203 can pre-process all input image data at once will be described. Then, an operation of a method in which the imaging-processing unit 210 generates an evaluation value will be described.

Figure 7:
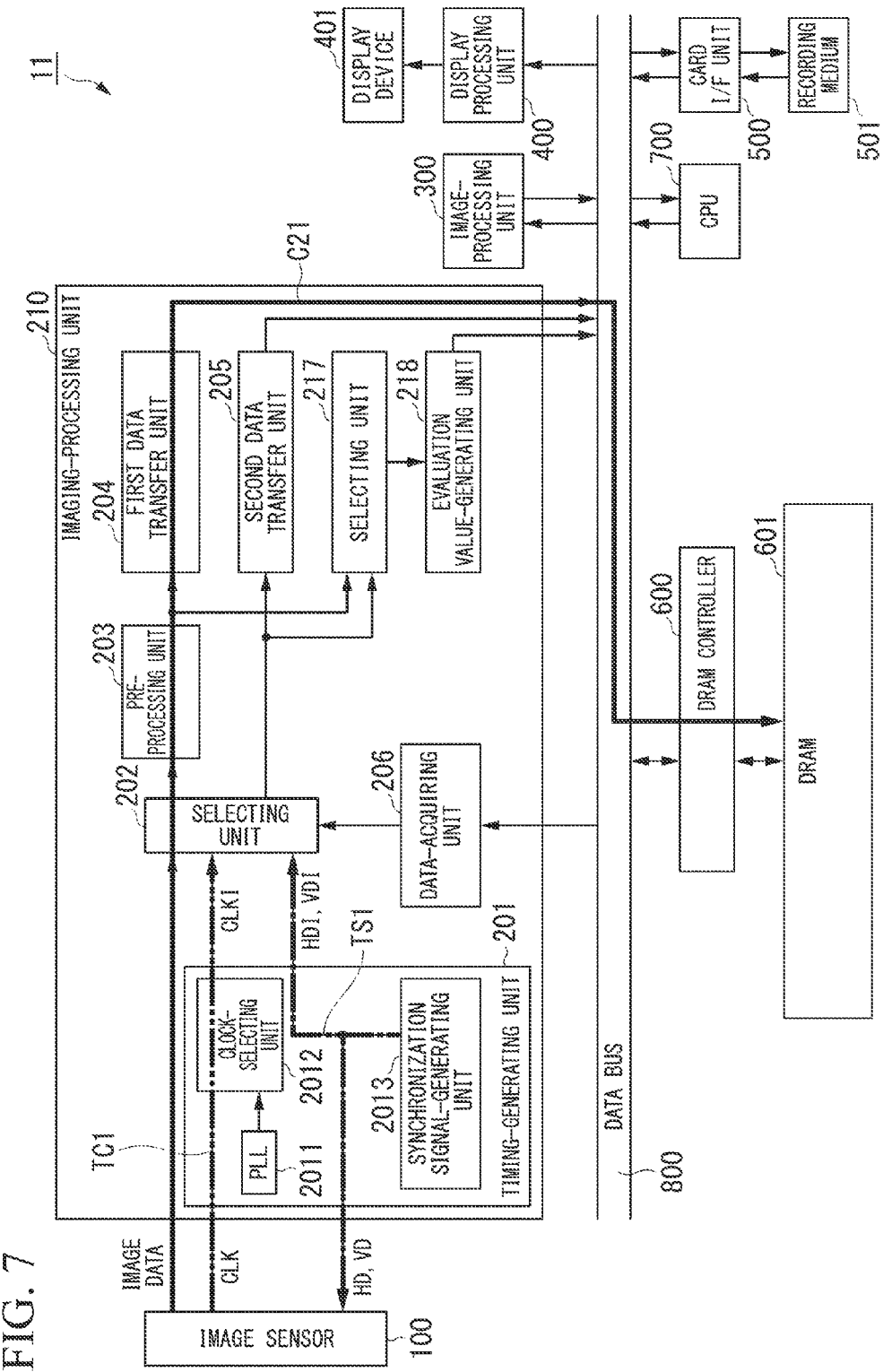
FIG. 7 is a diagram schematically illustrating an example of a first operation in image processing by the imaging device according to the second embodiment of the present invention.
Figure 8:
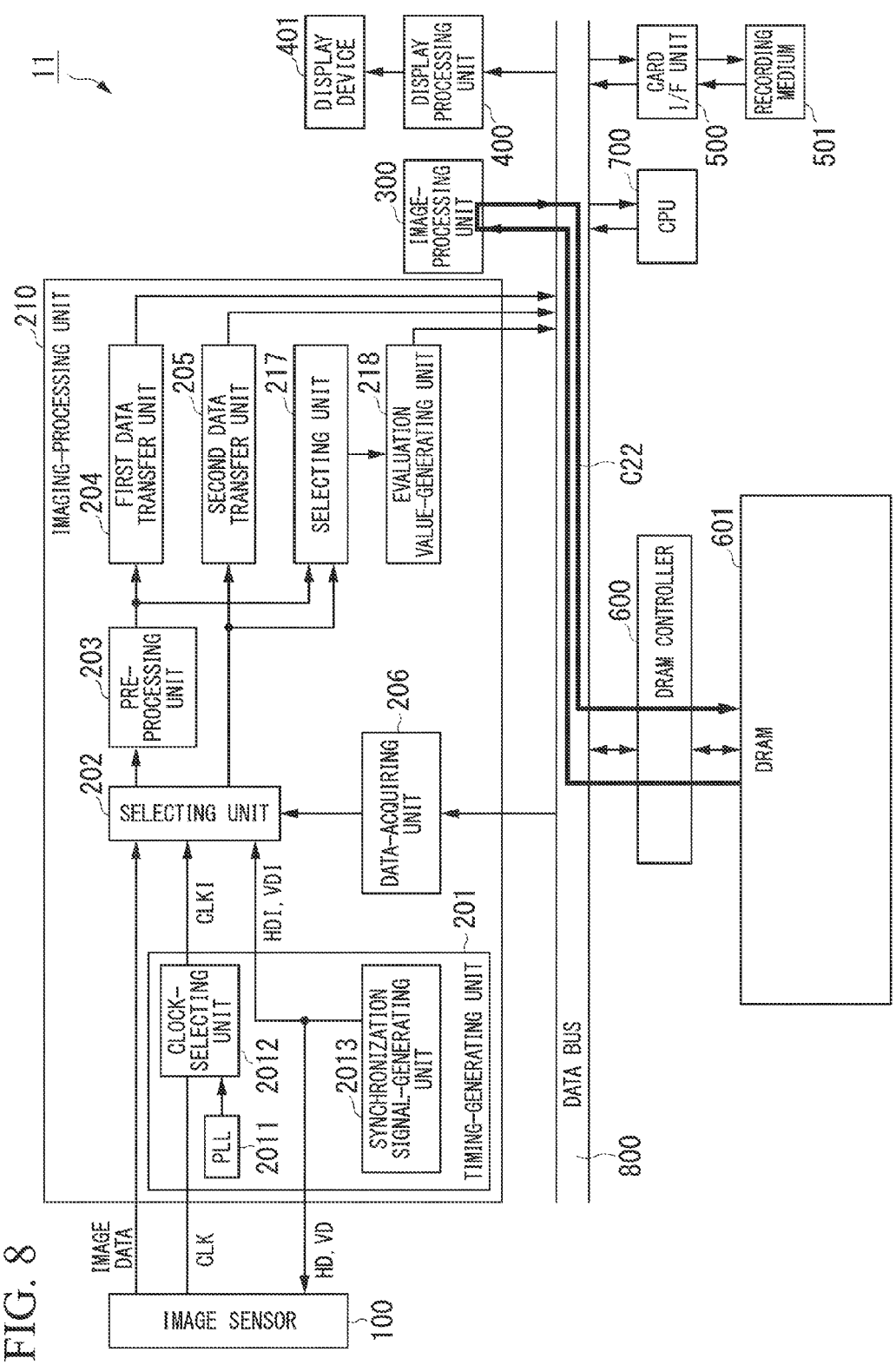
FIG. 8 is a diagram schematically illustrating an example of a second operation in the image processing by the imaging device according to the second embodiment of the present invention.
Figure 9:
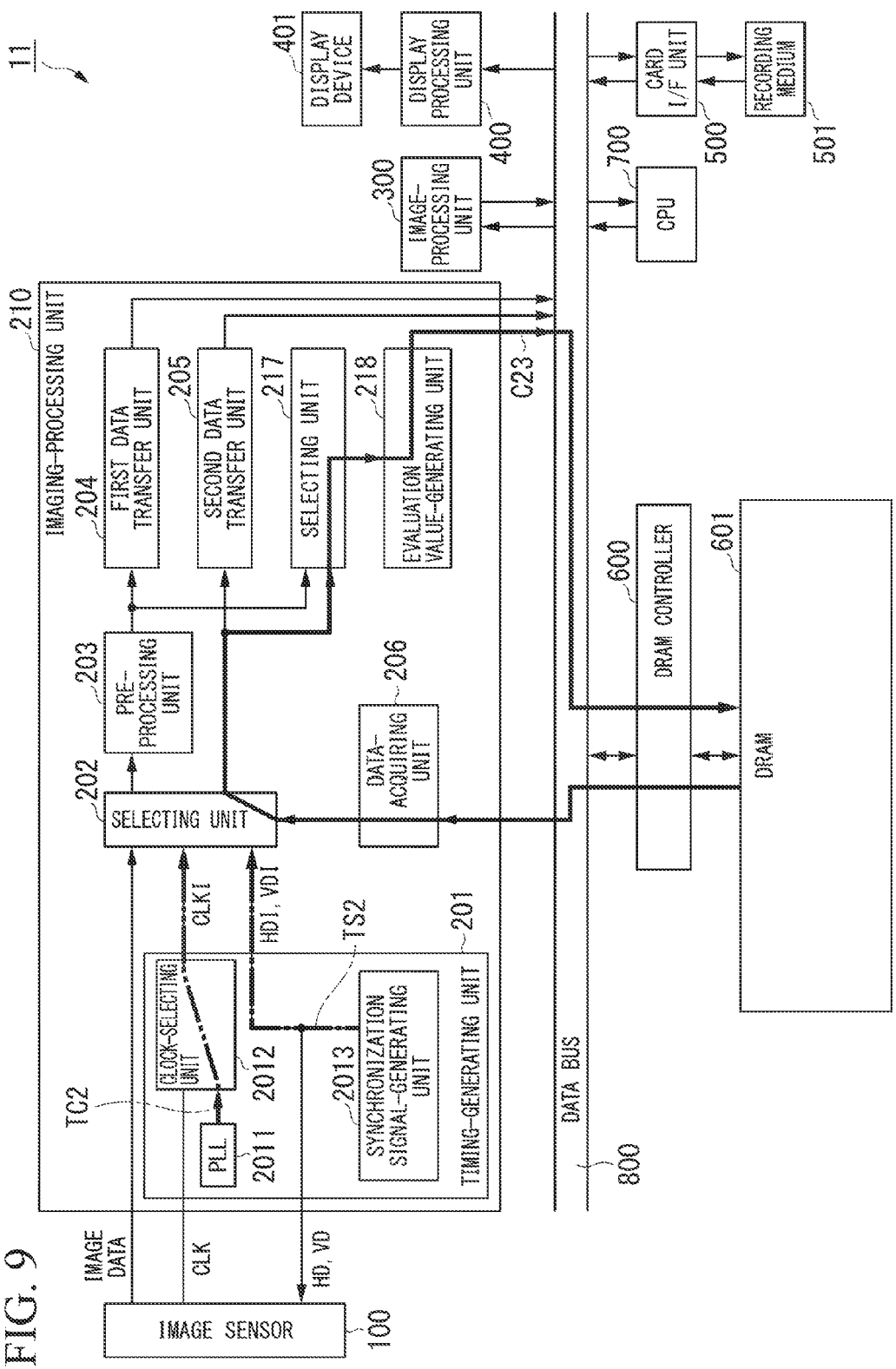
FIG. 9 is a diagram schematically illustrating an example of a third operation in the image processing by the imaging device according to the second embodiment of the present invention.
Figure 10:
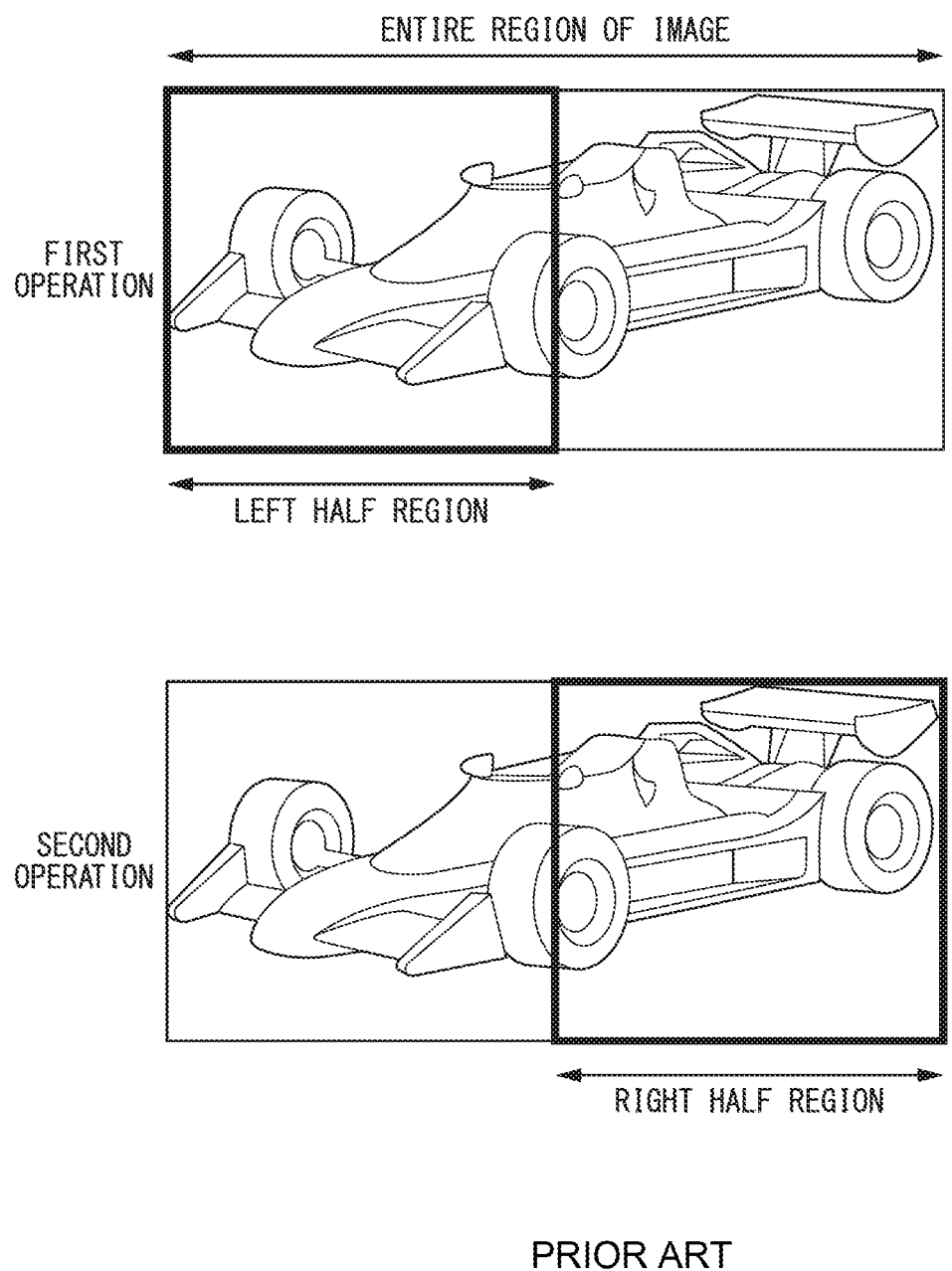
FIG. 10 is a diagram illustrating an example of an image on which image processing is performed in a conventional imaging device.

Each of FIGS. 7 to 9 is a diagram schematically illustrating an example of pre-processing and evaluation value generation operations by the imaging device 11 according to this second embodiment. The operation of the imaging device 11 illustrated in FIGS. 7 to 9 is an example of an operation in which the image-processing unit 300 combines images stored in the DRAM 601 after each of two images acquired by changing the exposure time of the image sensor 100 is temporarily stored. The operation of the imaging device 11 illustrated in FIGS. 7 to 9 is an example of an operation in which the image-processing unit 300 stores the combined image in the DRAM 601 again, and generates an evaluation value based on the combined image stored in the DRAM 601. In FIG. 7, an example of the first operation in which the imaging device 11 acquires two images by changing the exposure time of the image sensor 100 is illustrated. In addition, in FIG. 8, an example of the second operation in which the imaging device 11 generates a combined image generated by combining the two acquired images is illustrated. In addition, in FIG. 9, an example of the third operation in which the imaging device 11 generates an evaluation value based on the generated combined image is illustrated.

<First Operation>

In the first operation, pre-processed image data obtained by pre-processing input image data of two images output from the image sensor 100 in real time is transferred (written) to the DRAM 601. The first operation is an operation in which the imaging-processing unit 210 performs pre-processing based on the timing of the image sensor 100. In FIG. 7, paths of a synchronization signal and a clock signal in the first operation and a path through which input image data is pre-processed are illustrated on the block diagram of the imaging device 11 illustrated in FIG. 6.

First, in the first operation, as in the operation of the first operation of the imaging device 10 according to the first embodiment illustrated in FIG. 2, the same synchronization signal is output to the image sensor 100 and the selecting unit 202 and the clock signal CLK input from the image sensor 100 is output to the selecting unit 202. More specifically, in a path of the synchronization signal of a path TS1 illustrated in FIG. 7, the horizontal synchronization signal HD and the vertical synchronization signal VD for driving the image sensor 100 generated by the synchronization signal-generating unit 2013 are output to the image sensor 100 and the same synchronization signals are output as the horizontal synchronization signal HDI and the vertical synchronization signal VDI to the selecting unit 202. In addition, in a path of the clock signal of a path TC1 illustrated in FIG. 7, the clock signal CLK input from the image sensor 100 selected by the clock-selecting unit 2012 is output as the clock signal CLKI to the selecting unit 202.

Then, in the first operation, as in the first operation of the imaging device 10 according to the first embodiment illustrated in FIG. 2, pre-processed image data obtained by pre-processing input image data output from the image sensor 100 in real time is transferred (written) to the DRAM 601. The transfer (writing) of the pre-processed image data to the DRAM 601 in the first operation is performed twice for each image acquired by changing the exposure time of the image sensor 100 in a path of image data of a path C11 illustrated in FIG. 7. Thereby, the pre-processed image data of two images after pre-processing an image of each of the short exposure and the long exposure acquired by changing an exposure time is stored in the DRAM 601.

More specifically, the image sensor 100 captures one image in the short exposure and outputs input image data (hereinafter referred to as "short exposure input image data") of the captured image of the short exposure to the imaging-processing unit 210 at the timing synchronized with the clock signal CLK. In the imaging-processing unit 210, the short exposure input image data input from the image sensor 100 is fetched at the timing synchronized with the clock signal CLK, and the fetched short exposure input image data is sequentially input to the selecting unit 202 within the imaging-processing unit 210 at the timing synchronized with the clock signal CLK. Then, the selecting unit 202 sequentially outputs the input short exposure input image data to the pre-processing unit 203 at the timing synchronized with the clock signal CLK.

The pre-processing unit 203 pre-processes the short exposure input image data sequentially input from the selecting unit 202. The pre-processing unit 203 sequentially outputs pre-processed image data (hereinafter referred to as "short exposure pre-processed image data") of an image of the short exposure after the pre-processing has been performed to the first data transfer unit 204 at the timing synchronized with the clock signal CLK. Then, the first data transfer unit 204 transfers (writes) the short exposure pre-processed image data sequentially input from the pre-processing unit 203 to the DRAM 601 via the DRAM controller 600 at the timing synchronized with the clock signal CLK. Thereby, the short exposure pre-processed image data is stored in the DRAM 601 after the pre-processing has been performed.

Subsequently, the image sensor 100 captures one image in the long exposure, and outputs input image data (hereinafter referred to as "long exposure input image data") of the captured image of the long exposure to the imaging-processing unit 210 at the timing synchronized with the clock signal CLK. In the imaging-processing unit 210, the long exposure input image data input from the image sensor 100 is fetched at the timing synchronized with the clock signal CLK and the fetched long exposure input image data is sequentially input to the selecting unit 202 within the imaging-processing unit 210 at the timing synchronized with the clock signal CLK. Then, the selecting unit 202 sequentially outputs the input long exposure input image data to the pre-processing unit 203 at the timing synchronized with the clock signal CLK.

The pre-processing unit 203 pre-processes the long exposure input image data sequentially input from the selecting unit 202. The pre-processing unit 203 sequentially outputs pre-processed image data (hereinafter referred to as "long exposure pre-processed image data") of an image of the long exposure after the pre-processing has been performed to the first data transfer unit 204 at the timing synchronized with the clock signal CLK. Then, the first data transfer unit 204 transfers (writes) the long exposure pre-processed image data sequentially input from the pre-processing unit 203 to the DRAM 601 via the DRAM controller 600 at the timing synchronized with the clock signal CLK. Thereby, the long exposure pre-processed image data is stored in the DRAM 601 after the pre-processing has been performed.

In this manner, in the first operation, the short exposure pre-processed image data obtained by pre-processing the image of the short exposure output by the image sensor 100 and the long exposure pre-processed image data obtained by pre-processing the image of the long exposure output by the image sensor 100 are stored in the DRAM 601 based on the timing of the image sensor 100.

Even in the first operation, the pre-processing unit 203 also outputs the pre-processed image data output to the first data transfer unit 204 to the selecting unit 217 and outputs the pre-processed image data input by the selecting unit 217 to the evaluation value-generating unit 218, so that the evaluation value-generating unit 218 can generate the evaluation value based on the pre-processed image data input by the evaluation value-generating unit 218. Thereby, the evaluation value based on the long exposure pre-processed image data or the short exposure pre-processed image data can be stored in the DRAM 601.

<Second Operation>

Thereafter, the imaging device 11 generates a combined image generated by combining pre-processed image data of two images obtained by performing pre-processing in the first operation and transfers (writes) the generated combined image to the DRAM 601 again. In FIG. 8, a path of the data in the second operation is illustrated on the block diagram of the imaging device 11 illustrated in FIG. 6.

This second operation is an operation in which the image-processing unit 300 provided in the imaging device 11 performs an image combining process based on the long exposure pre-processed image data and the short exposure pre-processed image data stored in the DRAM 601. That is, in the second operation, a component different from the imaging-processing unit 210 operates. Accordingly, the timing to be used by the imaging-processing unit 210 as a reference during the period of the second operation is not limited. Thus, in the second operation, it is possible to reduce power consumption of the image sensor 100 in a state equivalent to that in which the image sensor 100 is separated from the imaging-processing unit 210 by preventing the horizontal synchronization signal HDI and the vertical synchronization signal VDI generated by the timing-generating unit 201 from being output as the horizontal synchronization signal HD and the vertical synchronization signal VD to the image sensor 100.

In the second operation, in a path of image data of a path C22 illustrated in FIG. 8, pre-processed image data (hereinafter referred to as "combined pre-processed image data") of a combined image obtained by combining the long exposure pre-processed image data and the short exposure pre-processed image data stored in the DRAM 601 is transferred (written) to the DRAM 601. More specifically, in the second operation, the image-processing unit 300 sequentially acquires (reads) the short exposure pre-processed image data stored in the DRAM 601 via the DRAM controller 600. Subsequently, the image-processing unit 300 sequentially acquires (reads) the long exposure pre-processed image data stored in the DRAM 601 via the DRAM controller 600. Then, the image-processing unit 300 performs an image combining process of combining two images of the acquired short exposure pre-processed image data and long exposure pre-processed image data. The image-processing unit 300 transfers (writes) the combined pre-processed image data of one combined image generated by performing the image combining process to the DRAM 601 via the DRAM controller 600 again. Thereby, the processed image data before combining of the combined image after the image combining process has been performed is stored in the DRAM 601.

<Third Operation>

Thereafter, the imaging device 11 transfers (writes) the evaluation value generated based on the pre-processed image data of the combined image obtained by the image combining process in the third operation to the DRAM 601. This third operation is an operation in which the imaging-processing unit 210 generates the evaluation value based on the internal timing of the imaging-processing unit 210. In FIG. 9, the paths of the synchronization signal and the clock signal in the third operation and the path through which the evaluation value is generated based on the pre-processed image data of the combined image are illustrated on the block diagram of the imaging device 11 illustrated in FIG. 6.

First, in the third operation, as in the second operation of the imaging device 10 according to the first embodiment illustrated in FIG. 3, the synchronization signal generated by the synchronization signal-generating unit 2013 is output to the selecting unit 202 and the clock signal generated by the PLL 2011 is output to the selecting unit 202. More specifically, in a path of a synchronization signal of a path TS2 illustrated in FIG. 9, at the internal timing of the imaging-processing unit 210 generated by the synchronization signal-generating unit 2013, the horizontal synchronization signal HDI and the vertical synchronization signal VDI to be used when each component processes image data are output to the selecting unit 202. In addition, in the path of the clock signal of the path TC2 illustrated in FIG. 9, the clock signal generated by the PLL 2011 selected by the clock-selecting unit 2012 is output as the clock signal CLKI to the selecting unit 202.

In the third operation, as in the second operation of the imaging device 10 according to the first embodiment illustrated in FIG. 3, the timing-generating unit 201 does not output the generated horizontal synchronization signal HDI and vertical synchronization signal VDI as the horizontal synchronization signal HD and the vertical synchronization signal VD to the image sensor 100. Thereby, even in the third operation, it is possible to reduce power consumption of the image sensor 100 in a state equivalent to that in which the image sensor 100 is separated from the imaging-processing unit 210.

Then, in the third operation, in a path of image data of a path C23 illustrated in FIG. 9, an evaluation value generated based on the combined pre-processed image data of the combined image stored in the DRAM 601 is transferred (written) to the DRAM 601.

More specifically, in the third operation, the data-acquiring unit 206 sequentially acquires (reads) the combined pre-processed image data stored in the DRAM 601 at the timing synchronized with the clock signal CLKI. The data-acquiring unit 206 sequentially outputs the acquired combined pre-processed image data to the selecting unit 202 at the timing synchronized with the clock signal CLKI. Then, the selecting unit 202 sequentially outputs the input combined pre-processed image data to the selecting unit 217 at the timing synchronized with the clock signal CLKI. Then, the selecting unit 217 sequentially outputs the input combined pre-processed image data to the evaluation value-generating unit 218 at the timing synchronized with the clock signal CLKI.

The evaluation value-generating unit 218 calculates (generates) an AE evaluation value and an AWB evaluation value based on the combined pre-processed image data sequentially input from the selecting unit 217. The evaluation value-generating unit 218 transfers (writes) each of the generated AE evaluation value and AWB evaluation value to the DRAM 601 via the DRAM controller 600 at the timing synchronized with the clock signal CLKI. Thereby, each of the AE evaluation value and the AWB evaluation value based on the combined pre-processed image data of the combined image is stored in the DRAM 601.

In this manner, in the third operation, the evaluation value based on the combined image generated by the image-processing unit 300 through the image combining process based on the internal timing of the imaging-processing unit 210 is stored in the DRAM 601. Thereby, short exposure pre-processed image data obtained by pre-processing short exposure input image data of one image captured by the image sensor 100 in the short exposure, long exposure pre-processed image data obtained by pre-processing long exposure input image data of one image captured by the image sensor 100 in the long exposure, combined pre-processed image data obtained by combining the short exposure pre-processed image data and the long exposure pre-processed image data, and an evaluation value generated based on the combined pre-processed image data are stored in the DRAM 601.

In this manner, the imaging device 11 pre-processes an image output by the image sensor 100 based on the timing of the image sensor 100 in the first operation and generates an evaluation value based on the combined image stored in the DRAM 601 based on the internal timing of the imaging-processing unit 210 in the third operation. At this time, the imaging device 11 adjusts a frequency of the clock signal CLKI in the third operation to a frequency at which the generation of the evaluation value based on the combined pre-processed image data can be completed by the imaging-processing unit 210. Thereby, in the imaging device 11, it is possible to average access to the DRAM 601 in the third operation and prevent pressure from being imposed on the bus bandwidth of the data bus 800 due to concentration of image data flowing through the data bus 800 in a partial period in the third operation.

Because the bus bandwidth of the data bus 800 in the imaging device 11 can be considered to be similar to that of the operation in which the bus bandwidth is averaged in the imaging device 10 according to the first embodiment illustrated in FIG. 5, detailed description is omitted.

As described above, even in the imaging device 11 according to this second embodiment, the synchronization signal and the clock signal are switched in an operation based on the timing of the image sensor 100 and an operation based on the internal timing of the imaging-processing unit 210. More specifically, the synchronization signal and the clock signal serving as the reference are switched in the first operation of performing pre-processing in real time to process all input image data input from the image sensor 100 without loss and the third operation of generating the evaluation value based on the image data stored in the DRAM 601.

Thereby, even in the imaging device 11 according to this second embodiment, as in the imaging device 10 according to the first embodiment, it is possible to average the bus bandwidth of the data bus 800 in the period in which an operation is performed based on the internal timing of the imaging-processing unit 210 and suppress pressure on the bus bandwidth as the limitation of operations of other components provided in the imaging device 11. Thereby, even in the imaging device 11 according to this second embodiment, as in the imaging device 10 according to the first embodiment, each component provided in the imaging device 11 can efficiently use the data bus 800.

In addition, in the imaging device 11 according to this second embodiment, in addition to pre-processing on an image input from the images sensor 100, it is possible to generate an evaluation value based on image data (pre-processed image data of one image of a wide dynamic range obtained by performing an image combining process on pre-processed image data of short exposure and pre-processed image data of long exposure in an example of an operation according to this second embodiment) on which the image-processing unit 300 has performed image processing. More specifically, in the third operation, the imaging device 11 can generate the evaluation value based on combined pre-processed image data stored in the DRAM 601. Then, in the imaging device 11 according to the first embodiment, it is also possible to expect an advantageous effect such as the reduction of power consumption or an amount of heat generation due to an operation at a low speed by setting the timing of the operation in the period of the third operation in which the imaging-processing unit 210 operates based on the internal timing to a late timing.

In addition, in the imaging device 11 according to this second embodiment, it is possible to prevent the horizontal synchronization signal HD and the vertical synchronization signal VD for driving the image sensor 100 from being output to the image sensor 100 during periods of the second operation and the third operation in which the imaging-processing unit 210 does not operate based on the timing of the image sensor 100. Thereby, in the imaging device 11 according to this second embodiment, the state can be controlled to that in which the operation of the image sensor 100 is stopped and power consumption of the image sensor 100 can also be reduced during a period in which a process can be performed at a timing different from that of the image sensor 100.

Although the case in which an image generated by the image-processing unit 300 for generating an evaluation value is a combined image obtained by performing an image combining process in the imaging device 11 according to this second embodiment has been described, the image for generating the evaluation value is not limited to only the combined image obtained by performing the image combining process. For example, the concept of the present invention can be similarly applied to an image on which gain adjustment for adjusting brightness of the image has been performed or an image on which various other image processing has been performed.

In addition, in the description of the operation of the imaging device 11 according to this second embodiment, an operation in which a data amount of input image data of the horizontal direction of the image sensor 100 is less than a data amount of image data capable of being held by the line memory provided in the pre-processing unit 203 provided in the imaging-processing unit 210 and the pre-processing unit 203 can pre-process all input image data at once has been described. However, the data amount of the input image data of the horizontal direction of the image sensor 100 may be greater than the data amount of the image data capable of being held by the line memory provided in the pre-processing unit 203. In this case, in the imaging device 11 according to this second embodiment, as in the imaging device 10 according to the first embodiment, an operation of performing pre-processing through a plurality of separate operations in a range of an amount of data capable of being pre-processed and generating an evaluation value after the image-processing unit 300 performs image processing after pre-processing on all regions of the image has been completed can also be similarly considered. In this case, concepts of a process of providing an overlap region, the number of operations of pre-processing, an order in which pre-processing is performed when a region of an image is divided, a direction in which the image sensor 100 outputs input image data, and a direction in which pre-processing is performed according to a direction in which the image is divided, etc. are similar to those of the imaging device 10 according to the first embodiment.

A configuration in which the evaluation value-generating unit 218 is provided as the signal-processing unit for performing a process other than pre-processing within the imaging-processing unit 210 in the imaging device 11 according to this second embodiment has been described. However, the signal-processing unit is not limited to the configuration shown in this second embodiment, and the concept of the present invention can also be similarly applied to the case in which a signal-processing unit for performing a process other than evaluation value generation is provided.

As described above, in the above-described embodiments, a timing-generating unit is provided as a configuration for outputting a timing when the image-processing unit provided in the imaging device performs a plurality of processes.

Then, in the above-described embodiments, a configuration has been made to switch the timing (the synchronization signal and the clock signal in this embodiment) at which the imaging-processing unit operates in the operation based on the timing of the image sensor and the operation based on the internal timing of the imaging-processing unit when the imaging-processing unit provided in the imaging device performs a plurality of processes. More specifically, a configuration is made so that the operation is performed based on the timing of the image sensor when the input image data input from the image sensor is processed in real time and that the operation is performed based on the timing generated within the imaging-processing unit when the process is performed at the timing different from that of the image sensor. Thereby, in the above-described embodiments, it is possible to execute a plurality of processes at the optimum timing at which pressure on the bus bandwidth within the processing period has been suppressed and efficiently use a data bus.

In addition, in the above-described embodiments, the timing at which the operation is performed based on the internal timing of the imaging-processing unit is set to be later than the timing at which the operation is performed based on the timing of the image sensor. Thereby, in the above-described embodiments, it is possible to suppress pressure on the bus bandwidth of the data bus provided in the imaging device and reduce power consumption or an amount of heat generation of the imaging device. In addition, in the above-described embodiments, the state can be controlled to that in which the operation of the image sensor is stopped when the operation is performed based on the internal timing of the imaging-processing unit. Thereby, in the above-described embodiments, the power consumption of the image sensor can also be reduced.

In this embodiment, the case in which it is possible to expect an advantageous effect of suppressing pressure on the bus bandwidth and reducing power consumption or an amount of heat generation due to a low-speed operation by the imaging device according to this embodiment by setting the timing later than that at which input image data input from the image sensor is processed in real time when the process is performed at the timing different from that of the image sensor has been described. However, for example, when there is an additional bus bandwidth of the data bus provided in the imaging device, the timing when the process is performed at a different timing from the image sensor can be inversely set to be earlier than that of the image sensor. In this case, a processing time of the process to be performed at the different timing from the image sensor can also be set to a short time and a processing speed of the imaging device can be increased. In this manner, in this embodiment, it is possible to cause the imaging device to execute each process at an optimum timing for implementing desired performance, that is, in an optimum bus bandwidth.

In this embodiment, the case in which a process other than pre-processing to be performed on image data on which the image-processing unit has performed image processing is a process of generating an evaluation value for performing control related to photographing in the imaging device has been described. However, content of the process on the image data on which the image-processing unit has performed image processing is not limited to the above-described embodiments. For example, the concept of the present invention can be applied to various other processes such as a resizing process of generating a reduced image obtained by reducing the image after image processing.

While preferred embodiments of the invention have been described and illustrated above, it should be understood that these are exemplary of the invention and are not to be considered as limiting. Additions, omissions, substitutions, and other modifications can be made without departing from the spirit or scope of the present invention. Accordingly, the invention is not to be considered as being limited by the foregoing description, and is only limited by the scope of the appended claims.

What is claimed is:

1. An imaging device, comprising:
a solid-state imaging device configured to include a plurality of pixels, output a pixel signal according to an image of an imaged subject as input image data, and output a first clock signal which is a timing at which the input image data is output;
a storage unit configured to store data;
an imaging-processing unit configured to process the input image data output from the solid-state imaging device or image data stored in the storage unit; and
a timing-generating unit configured to generate timings at which the solid-state imaging device and the imaging-processing unit operate,
wherein in a first operation in which the imaging-processing unit processes the input image data output from the solid-state imaging device based on the timing of the solid-state imaging device, the timing-generating unit generates a first synchronization signal for driving the solid-state imaging device to output the generated first synchronization signal to the solid-state imaging device and output the first synchronization signal and a first clock signal input from the solid-state imaging device to the imaging-processing unit as the timing at which the imaging-processing unit operates,
wherein in a second operation in which the imaging-processing unit processes the image data stored in the storage unit based on an internal timing of the imaging-processing unit, the timing-generating unit outputs a generated second synchronization signal and second clock signal to the imaging-processing unit as the timing at which the imaging-processing unit operates and does not output the first synchronization signal to the solid-state imaging device,
wherein the timing-generating unit includes a synchronization signal-generating unit configured to generate the first synchronization signal in the first operation and generate the second synchronization signal in the second operation; a clock signal-generating unit configured to generate the second clock signal in the second operation; and a clock-selecting unit configured to select and output the first clock signal in the first operation and select and output the second clock signal in the second operation,
wherein the synchronization signal-generating unit generates the second synchronization signal having different synchronization from the first synchronization signal, and the clock signal-generating unit generates the second clock signal having a different frequency from the first clock signal,
wherein the imaging-processing unit further includes a processing unit configured to output data obtained by processing the input image data output from the solid-state imaging device or image data stored in the storage unit a data transfer unit configured to transfer the data output by the processing unit to the storage unit and a data-acquiring unit configured to acquire the image data stored in the storage unit,
wherein the processing unit includes a pre-processing unit configured to output pre-processed image data obtained by pre-processing the input image data input from the solid-state imaging device, and the data transfer unit transfers the pre-processed image data to the storage unit, and
wherein the pre-processing unit includes a line memory configured to hold an amount of input image data which is less than a data amount of the input image data of a first direction in the image and output the pre-processed image data obtained by pre-processing part of the input image data of the image divided within a range of a data amount of the input image data capable of being held by the line memory, the data transfer unit includes a first transfer unit configured to transfer the pre-processed image data to the storage unit, and a second transfer unit configured to transfer the remaining input image data of the first direction in the image which has not been pre-processed by the pre-processing unit as original image data to the storage unit, the data-acquiring unit acquires the original image data stored in the storage unit, and the image-processing unit further includes a selecting unit configured to output the input image data input from the solid-state imaging device or the original image data acquired by the data-acquiring unit to at least one of the pre-processing unit and the second data transfer unit.

2. The imaging device according to claim 1, wherein
in the first operation, the imaging-processing unit transfers first pre-processed image data after the pre-processing unit has pre-processed the input image data of a first image obtained by dividing the image within the range of the data amount of the input image data capable of being held by the line memory to the storage unit through the first data transfer unit and transfers the input image data of a second image obtained by dividing the image which has not been pre-processed by the pre-processing unit as original data to the storage unit through the second data transfer unit, and
in the second operation after the first operation has been completed, the data-acquiring unit acquires the original data stored in the storage unit, the selecting unit outputs the original data to the pre-processing unit, and the pre-processing unit transfers second pre-processed image data obtained by pre-processing the original data to the storage unit through the first data transfer unit.

3. The imaging device according to claim 1, wherein
the processing unit further includes:
a signal-processing unit configured to transfer processed data obtained by processing the image data stored in the storage unit to the storage unit.

4. The imaging device according to claim 3, wherein
the signal-processing unit is an evaluation value-generating unit configured to generate an evaluation value for controlling photographing in the imaging device as the processed data based on the image data stored in the storage unit, and
the imaging-processing unit further includes:
a selecting unit configured to output at least one of the pre-processed image data and the image data acquired by the data-acquiring unit to the evaluation value-generating unit.

5. The imaging device according to claim 4, wherein
in the first operation, the imaging-processing unit transfers the pre-processed image data after the pre-processing unit has pre-processed the input image data to the storage unit through the data transfer unit, and
in the second operation after the first operation has been completed, the data-acquiring unit acquires the pre-processed image data stored in the storage unit or pre-processed image data after image processing has been performed by another component provided in the imaging device, the selecting unit outputs the pre-processed image data to the evaluation value-generating unit, and the evaluation value-generating unit transfers the evaluation value generated based on the pre-processed image data to the storage unit as the processed data.

6. An imaging device, comprising:
a solid-state imaging device configured to include a plurality of pixels, output a pixel signal according to an image of an imaged subject as input image data, and output a first clock signal which is a timing at which the input image data is output;
a storage unit configured to store data;
an imaging-processing unit configured to process the input image data output from the solid-state imaging device or image data stored in the storage unit; and
a timing-generating unit configured to generate timings at which the solid-state imaging device and the imaging-processing unit operate, wherein the timing-generating unit generates a first synchronization signal for driving the solid-state imaging device to output the generated first synchronization signal to the solid-state imaging device and output the first synchronization signal and a first clock signal input from the solid-state imaging device to the imaging-processing unit as the timing at which the imaging-processing unit operates, in a first operation in which the imaging-processing unit processes the input image data output from the solid-state imaging device based on the timing of the solid-state imaging device,
wherein the timing-generating unit outputs a generated second synchronization signal and second clock signal to the imaging-processing unit as the timing at which the imaging-processing unit operates and does not output the first synchronization signal to the solid-state imaging device, in a second operation in which the imaging-processing unit processes the image data stored in the storage unit based on an internal timing of the imaging-processing unit,
wherein the timing-generating unit includes:
  a synchronization signal-generating unit configured to generate the first synchronization signal in the first operation and generate the second synchronization signal in the second operation;
  a clock signal-generating unit configured to generate the second clock signal in the second operation; and
  a clock-selecting unit configured to select and output the first clock signal in the first operation and select and output the second clock signal in the second operation,
wherein the synchronization signal-generating unit generates the second synchronization signal having different synchronization from the first synchronization signal, and the clock signal-generating unit generates the second clock signal having a different frequency from the first clock signal,
wherein the imaging-processing unit further includes:
  a processing unit configured to output data obtained by processing the input image data output from the solid-state imaging device or image data stored in the storage unit;
  a data transfer unit configured to transfer the data output by the processing unit to the storage unit; and
  a data-acquiring unit configured to acquire the image data stored in the storage unit,
wherein the processing unit includes a pre-processing unit configured to output pre-processed image data obtained by pre-processing the input image data input from the solid-state imaging device, and the data transfer unit transfers the pre-processed image data to the storage unit,
wherein the pre-processing unit includes a line memory configured to hold an amount of input image data which is less than a data amount of the input image data of a first direction in the image and output the pre-processed image data obtained by pre-processing part of the input image data of the image divided within a range of a data amount of the input image data capable of being held by the line memory,
wherein the data transfer unit transfers the pre-processed image data to the storage unit, and transfers the remaining input image data of the first direction in the image which has not been pre-processed by the pre-processing unit as original image data to the storage unit,
wherein the data-acquiring unit acquires the original image data stored in the storage unit, and
wherein the image-processing unit further includes a selecting unit configured to output the input image data input from the solid-state imaging device or the original image data acquired by the data-acquiring unit to at least one of the pre-processing unit and the data transfer unit.

* * * * *